US006324169B1

(12) United States Patent
Roy

(10) Patent No.: US 6,324,169 B1
(45) Date of Patent: Nov. 27, 2001

(54) PROVIDING MULTIMEDIA CONFERENCING SERVICES OVER A WIDE AREA NETWORK INTERCONNECTING NONGUARANTEED QUALITY OF SERVICE LANS

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/515,822

(22) Filed: Feb. 29, 2000

Related U.S. Application Data

(62) Division of application No. 08/798,530, filed on Feb. 10, 1997, now Pat. No. 6,081,513.

(51) Int. Cl.[7] .................................................. H04L 12/16
(52) U.S. Cl. ............................................ 370/260; 379/202
(58) Field of Search .................................... 370/260, 261, 370/262, 263, 264, 265, 266; 379/202

(56) References Cited

U.S. PATENT DOCUMENTS

| | | |
|---|---|---|
| 5,422,883 | 6/1995 | Hauris et al. . |
| 5,563,882 | 10/1996 | Bruno et al. . |
| 5,600,644 * | 2/1997 | Chang et al. ......................... 370/404 |
| 5,625,407 | 4/1997 | Biggs et al. . |
| 5,673,253 | 9/1997 | Shaffer . |
| 5,684,527 * | 11/1997 | Terui et al. .............................. 348/15 |
| 5,689,553 | 11/1997 | Ahuja et al. . |
| 5,751,712 | 5/1998 | Farwell et al. . |
| 5,768,513 | 8/1998 | Kuthyar et al. . |
| 5,768,527 | 6/1998 | Zhu et al. . |
| 5,812,552 | 9/1998 | Arora et al. . |
| 5,835,129 * | 11/1998 | Kumar ................................... 348/15 |
| 6,049,531 * | 4/2000 | Roy ....................................... 370/260 |

OTHER PUBLICATIONS

W. Bux, "Local–Area Subnetworks: A Performance Comparison", IEEE Trnas. on Communications, vol. COM29, No. 10, Oct. 1991.
R. Guerin, et al., "Equivalent Capacity and Its Application to Bandwidth . . . ", IEEE Jrnl. on Selected Areas in Comm., vol. 9, No. 7, Sep. 1991.

* cited by examiner

Primary Examiner—Douglas Olms
Assistant Examiner—Ken Vanderpuye
(74) Attorney, Agent, or Firm—Karin L. Williams; William Ryan

(57) ABSTRACT

A method for providing real-time multimedia conferencing services is described over a hybrid network, consisting of packet-switched nonguaranteed quality of service local area networks and a cell-switched wide area network having a multimedia bridge connected to the wide area network. The local area networks and the multimedia bridge are interconnected to the wide area network via routers. New architectural entities within the multimedia bridge execute a multimedia performance and resource analysis algorithm and determine whether the network and the bridge have sufficient resources to satisfy the requirements of the multimedia conference call. If sufficient resources are not available, it is determined whether the requirements for the higher priority services can be provided by preempting the lower priority resources. Signaling information messages are exchanged between the communicating entities indicating whether the multimedia conference can be accepted, rejected, or accepted to operate in degraded mode, based on the analysis performed by the bridge.

8 Claims, 16 Drawing Sheets

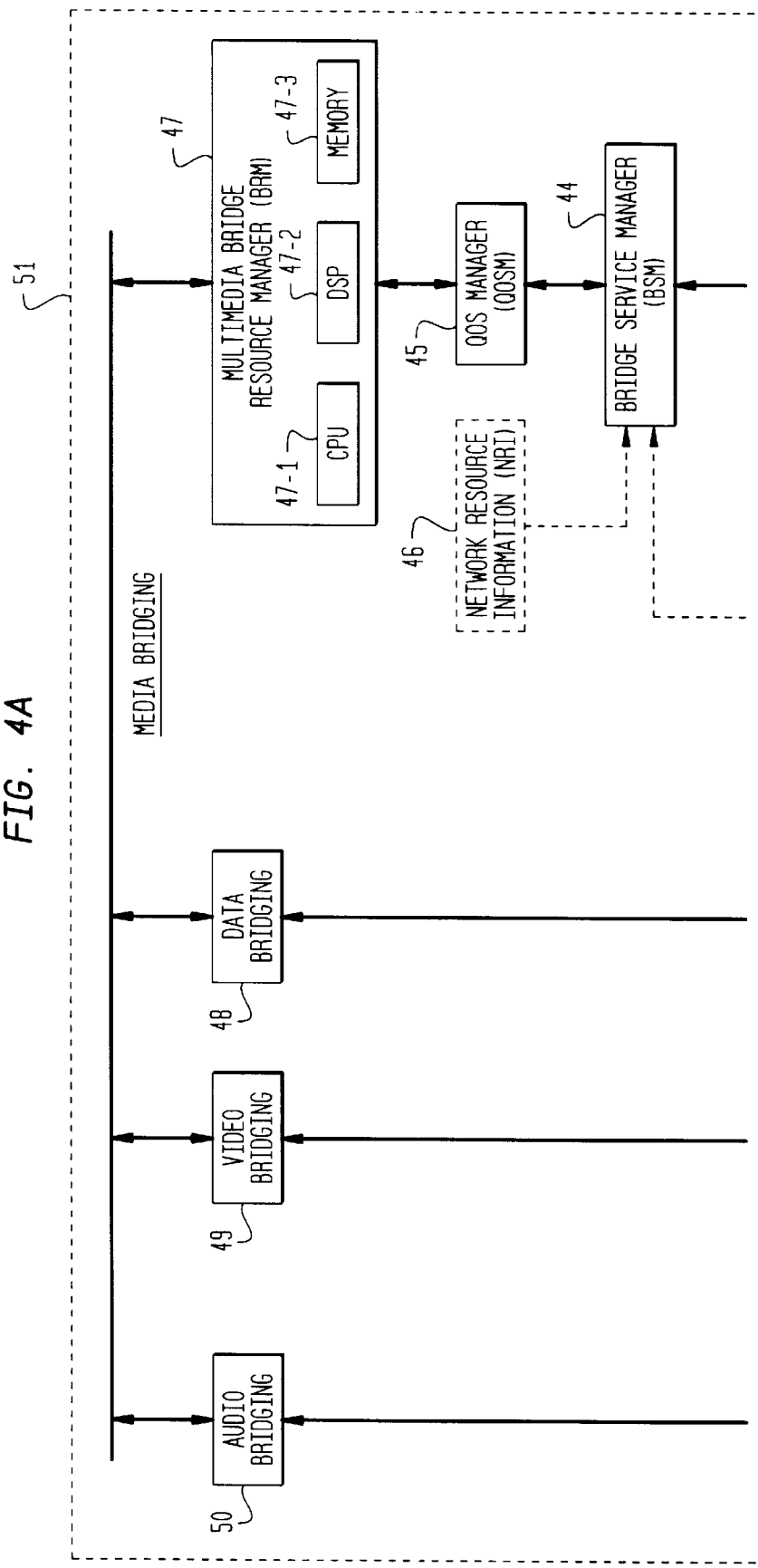
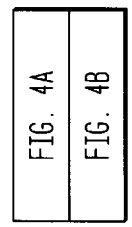
FIG. 4A
FIG. 4C

PROVIDING MULTIMEDIA CONFERENCING SERVICES OVER A WIDE AREA NETWORK INTERCONNECTING NONGUARANTEED QUALITY OF SERVICE LANS

CROSS-REFERENCE TO OTHER RELATED APPLICATIONS

This application is a division of U.S. application Ser. No. 08/798,530, filed Feb. 10, 1997, now U.S. Pat. No. 6,081,513, issued Jun. 27, 2000.

FIELD OF THE INVENTION

This invention relates to multimedia conferencing services and, more particularly, relates to a method for providing such services by interconnecting multiple nonguaranteed quality of service (NGQOS) local area networks (LANs) by an asynchronous transfer mode (ATM) wide area network (WAN) in which a multimedia bridging function is performed.

BACKGROUND OF THE INVENTION

Real-time multimedia conferencing services have typically been provided by connecting signals over circuit-switched networks, such as an Integrated Services Digital Network (ISDN), having guaranteed quality of service (QOS). Although circuit-switched networks provide a guarantee of QOS as they provide a communications channel for exclusive use by connected parties until the connection is released, they cannot save bandwidth through statistical multiplexing (i.e., by dynamically allocating bandwidth according to actual demand rather than on a predefined basis). Therefore, the adoption of multimedia services through the interconnection of geographically dispersed locations over circuit-switched networks is very limited because it is cost prohibitive.

Accordingly, millions of multimedia personal computers (MPCs) or workstations throughout the world are connected to packet-switched "nonguaranteed" quality of service local area networks such as Ethernet (EN), Token Ring (TN), or Fiber Distributed Data Intetface (FDDI). By definition of the protocol standards for each of EN, TN and FDDI, for example, the LANs are "nonguaranteed" in that there is no guarantee of performance in providing services through that network. Such networks are inherently unreliable as they provide no guarantee of bandwidth or quality of service parameters. Real-time multimedia conferencing services require a guarantee of bandwidth and quality of service parameters. A critical requirement for successful real-time conferencing is to ensure that there are sufficient network and bridging resources available to maintain the desired level of performance once the conference call has been accepted. However, in a conventional system the bridge has absolutely no knowledge of the state of the network and its resources.

Recently, the ATM network has emerged as the most promising networking technology for providing statistical multiplexing of real-time isochronous signals (i.e., signals repeating in time, such as 8 khz voice samples for example), such as audio and video, as well as asynchronous signals, such as data, while maintaining a guarantee of quality of service for each signal.

SUMMARY OF THE INVENTION

The present invention enables real-time conferencing services to be provided to dispersed locations interconnected by an ATM wide area network. The multimedia signals originating at the dispersed locations may be audio, video, or data signals, or any combination of such signals. The locations employ nonguaranteed quality of service packet switched local area networks which do not provide a guarantee of bandwidth or QOS parameters.

In such an environment, multimedia conferencing signals from the dispersed locations are carried to a bridge, located in the ATM network, to provide multimedia bridging. The bridged multimedia signals are then transmitted back over the ATM wide area network to the various locations. By using this method, the overall bandwidth required to transmit the multimedia signals between the dispersed locations is reduced through bridging and statistical multiplexing, especially for bursty signals.

In accordance with another aspect of the invention, architectural entities, such as a bridge service manager (BSM), quality of service manager (QOSM), multimedia bridge resource manager (BRM), and network resource information (NRI), residing within the upper layer architecture of the ATM network-based multimedia bridge (MMB), will execute a multimedia performance and resource analysis algorithm and will assess what type and quantity of resources for the ATM wide area network, the ATM network based multipoint multimedia bridge, and the local area networks, will be required to maintain the desired levels of quality of service for the multimedia conference call. The necessary properties of all network and bridge resources are examined by these architectural entities, and the absence of the required properties to satisfy the multimedia conferencing services are detected by the algorithm executed within the ATM wide area network-based bridge.

In yet another aspect of the invention, if the necessary resources are available to accept the conference call, the originating and the receiving computers of the dispersed locations are informed by the bridge, and the quality of service parameters for the conference call will be maintained after acceptance of the call. The locations are also informed that the conference call will operate in degraded mode when only the certain minimum acceptable criteria of the call are met due to unavailability of sufficient resources within the ATM network, the multimedia bridge, the local area networks, or any combination of the above. Finally, if the minimum requirement criteria of the conference call is not met, the bridge informs the calling and the called locations that the conference call cannot be accepted.

It is a feature of the present invention to send the new control signaling messages together with the H.323 standard based signaling messages, which will improve the multimedia conference call negotiating capabilities.

DETAILED DESCRIPTION

Figure 1:
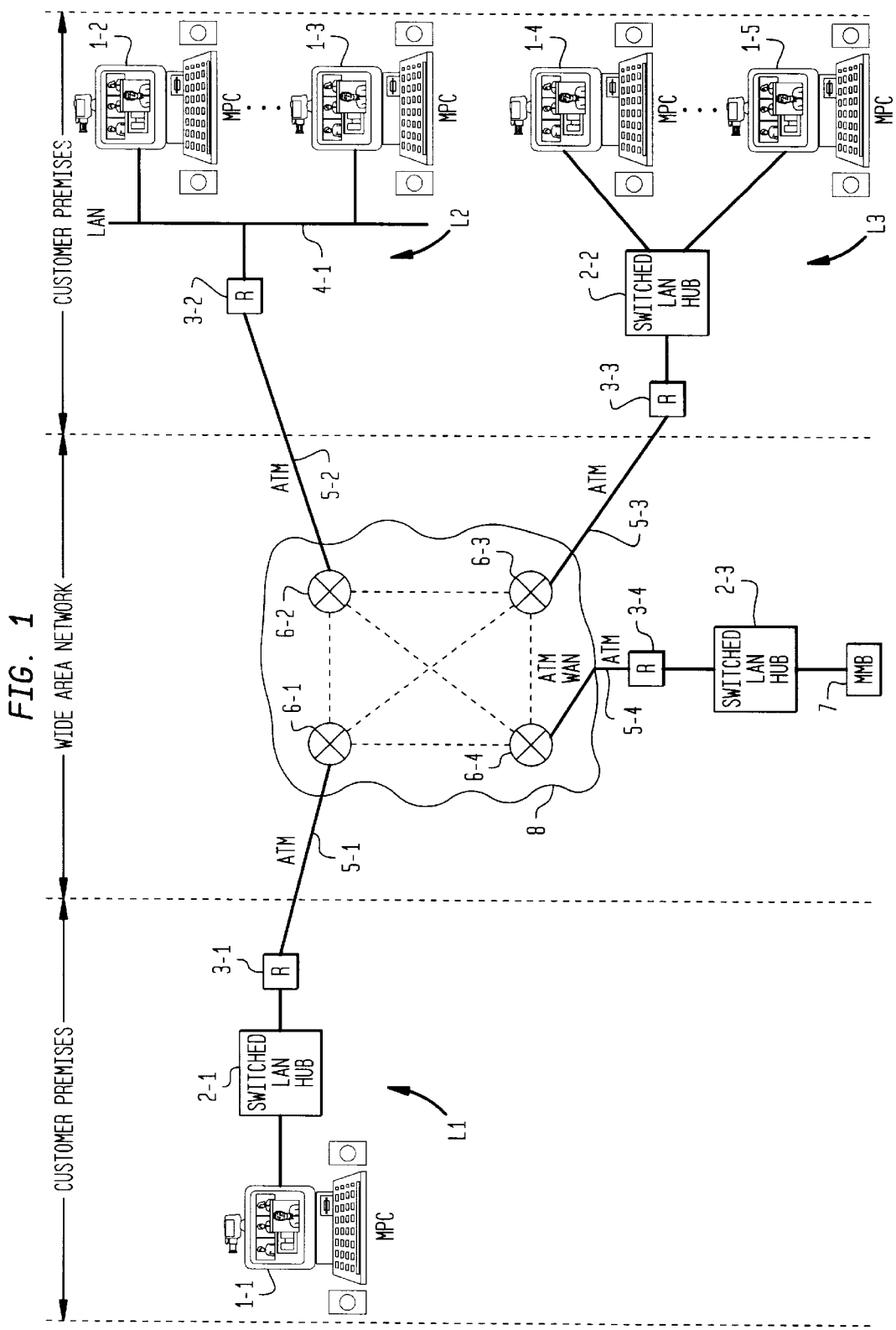
FIG. 1 illustrates one form of end-to-end network configuration for multipoint multimedia conferencing services.

FIG. 1 shows multimedia personal computers/ workstations 1-1 through 1-5, each of which is equipped with well-known multimedia conferencing application programs based on the H.323 standard of the International Telecommunications Union (ITU). Computer 1-1 is connected to switched local area network (LAN) hub 2-1 at location L1. Computers 1-2 and 1-3 are connected to shared LAN 4-1 at location, L2. Finally, computers 1-4 and 1-5 are connected to switched LAN hub 2-2 at location L3. Locations L1, L2 and L3 may each be displaced from one another by many miles.

Conventional router 3-1 is located at L1 for transferring signals from switched LAN hub 2-1 to ATM switch 6-1 of ATM WAN 8 over link 5-1. Similarly, conventional router 3-2 is located at L2 for transferring signals from shared LAN 4-1 to ATM switch 6-2 of ATM WAN 8 over link 5-2. Conventional router 3-3 is located at L3 for transferring signals from switched LAN hub 2-2 to ATM switch 6-3 of ATM WAN 8 over link 5-3. Signals are transferred for L1, L2 and L3, over links 5-1 through 54 using ATM protocol. Each of conventional routers 3-1 through 34 is equipped with an ATM interface and each preferably has traffic monitoring capability for the respective LAN hubs to which they are connected, whether the traffic from the LANs goes to the wide area network or remains confined within their respective locations. A switched local area network hub, such as 2-1, 2-2 or 2-3, has superior performance to that of a shared local area network, such as 4-1.

Switched LAN hubs 2-1, 2-2, and 2-3, as well as shared LAN 4-1, can be Ethernet (IEEE 802.3), Token Ring (IEEE 802.5), fast Ethernet (IEEE 802.10), or FDDI (operating in the nonguaranteed quality of service mode). Each of these LANs are of a type that provides a nonguaranteed quality of service.

Still referring to FIG. 1, multipoint multimedia bridge 7 is connected to a dedicated high-speed LAN hub 2-3 that provides protocol transparency with switched LAN hub 2-1, shared LAN 4-1, and switched LAN hub 2-2. Hub 2-3, connected only to multimedia bridge 7 and therefore dedicated to it, provides a guarantee of performance for bridge 7 in connection with parameters such as delay jitter, packet loss, error rate, and delay.

Bridge 7 is equipped with standard multipoint control unit (MCU), multipoint controller (MC) and multipoint processor (MP) functions in accordance with the ITU Rec. H.323 standard and has general conference control (GCC) and multipoint communication service (MCS) functions, operating in accordance with the ITU T-series standard. Bridge 7 also has a gatekeeper (GK) function, such as address translation, admission control, call control signaling, call authorization, and call management, as specified in the ITU Rec. H.323 standard. The communication between computers 1-1 through 1-5 and bridge 7 takes place in a master-slave relationship as described in the ITU Rec. H.323 standard. Bridge 7 plays the role of the master in controlling participating computers 1-1 through 1-5.

A multipoint (3 or more locations) conference call is always processed by bridge 7, which depacketizes all encapsulated packets of the multimedia bit streams of signals that originate from computers 1-1 through 1-5 and provides bridging for audio, video, and/or data (Applicant's use of the term "multimedia signals" is intended to include audio, video or data signals, or any combination of such signals).

A point-to-point call can also be processed by bridge 7 if the end stations (i.e., computers 1-1 through 1-5) want certain services, such as directory services, admission control, or address translation at the time of call setup, while the multimedia signals containing the actual payload can be sent through optimal virtual paths within the ATM wide area network that saves bandwidth.

In summary, FIG. 1 illustrates one form of end-to-end network configuration for multipoint multimedia conferencing services including switched LAN hubs and a shared LAN interconnected by an ATM WAN including a multimedia bridge. However, any form of network configuration, in which the multimedia bridge is connected to the WAN would be covered by the invention as described herein.

Figure 2:
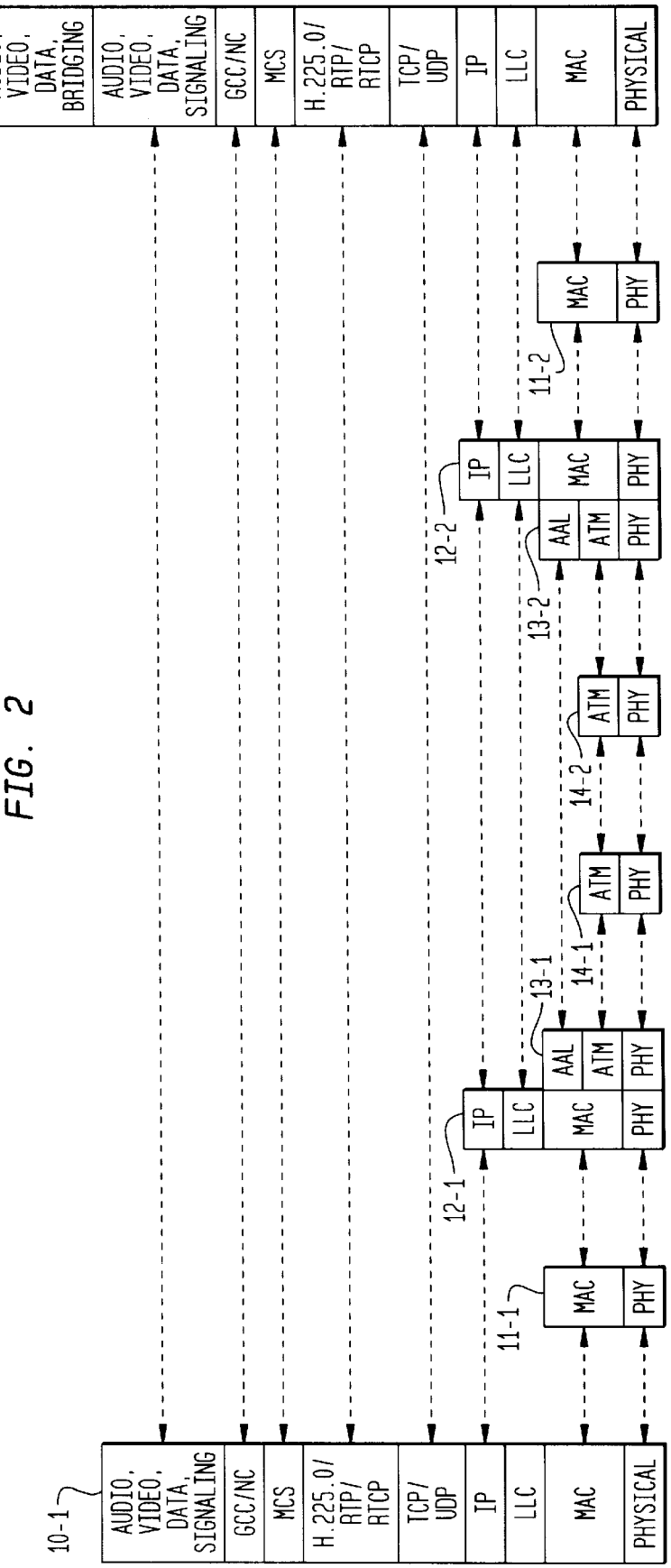
FIG. 2 is one form of high-level end-to-end protocol architecture for multipoint conferencing services, through the, interconnections illustrated in FIG. 1.

The protocol architecture for end-to-end communications for multimedia conferencing involving computer 1-1 and bridge 7 is explained in connection with FIG. 2. The protocol stack 10-1 running on computer 1-1 is effected by the following conventional entities: general conference control (GCC)/node controller (NC), multipoint communications services (MCS), H.225.0/real-time protocol (RTP)/ real-time control protocol (RTCP), transmission control protocol (TCP)/user datagram protocol (UDP), Internet Protocol (IP), logical link control (LLC), and medium access control (MAC) between the media (audio, video, and/or data) and a physical layer. Routers with ATM interfaces 3-1 and 3-4 encapsulate IP over the ATM protocol to transfer audio, video, and/or data over ATM links 5-1 and 5-4, respectively, to communicate over the ATM network 8. ATM routers 3-1 and 3-4 are connected to cell switched ATM nodes 6-1 and 6-4 of network 8, respectively. ATM switches 6-1 and 6-4 have the ATM protocol layer at the top of physical layer (14-1, 14-2). Bridge 7 has a protocol stack (10-2) similar to the multimedia computer (10-1), but it additionally has the additional audio/video/data bridging functionalities, which are not part of a conventional bridge.

Figure 3:
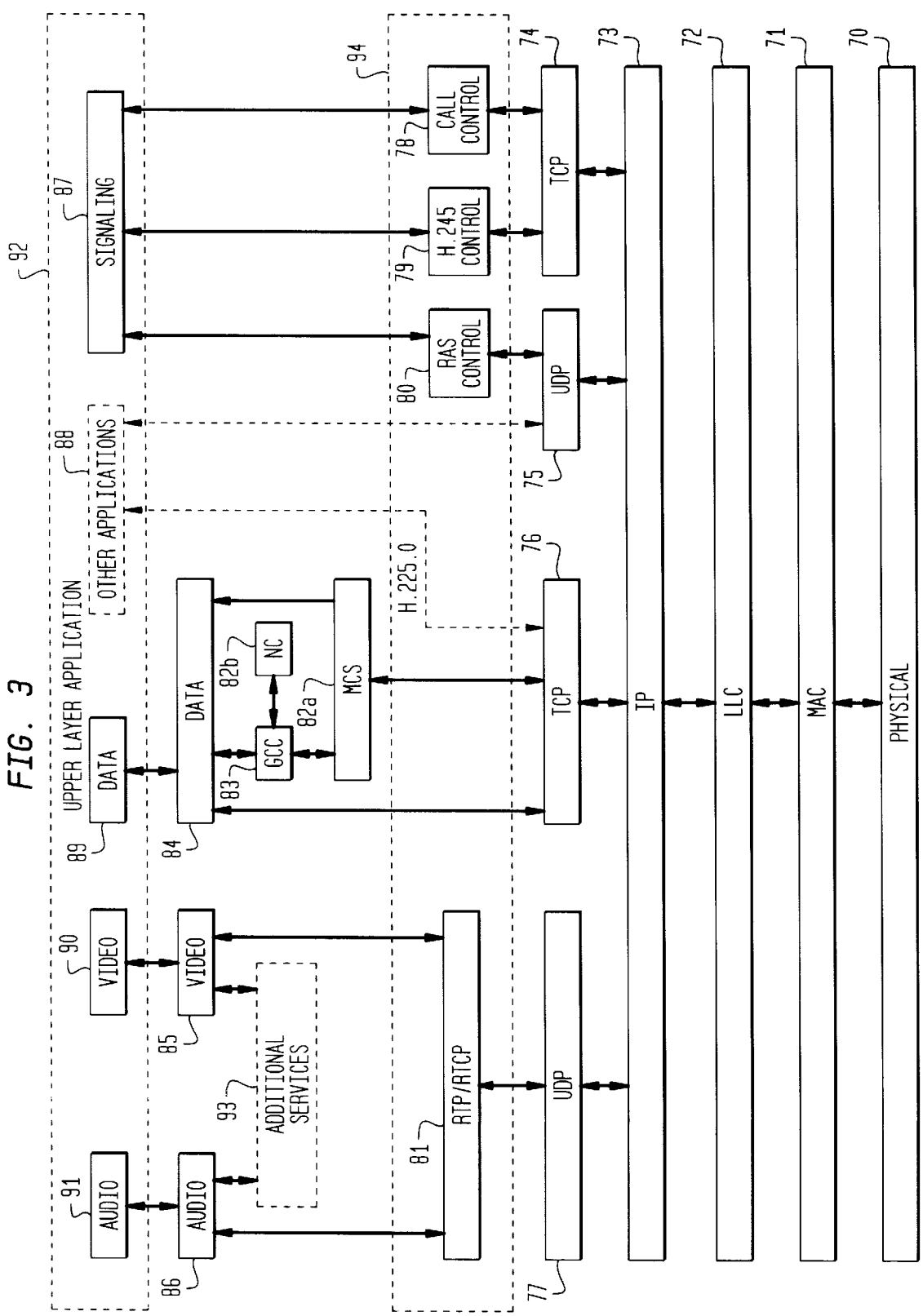
FIG. 3 illustrates one form of the nonguaranteed quality of service (NGQOS) local area network (LAN) based multimedia personal computer (MPC)/workstation protocol.

The detailed software architecture of computers 1-1 through 1-5 is shown in FIG. 3. Most of what is shown is conventional in accordance with ITU Rec. H323—however, entities 88 and 93 have been added. The communication between the upper layer entity 92 (audio 91, video 90, data 89, signaling 87, and other applications 88) and lower layer entities (audio 86, video 85, data 84, registration, admissions, and status (RAS) control 80, H.245 control 79, and Call Control 78) can take place directly as needed. The lower layer entities such as audio 86 and video 85 facilitate the provision of other services 93 (e.g., inter-media and intra-media synchronization) before transfer of the audio and video signals to the upper layer application. Similarly, data signal 84 can also be provided with spatial synchronization services (not shown in FIG. 3), along with the audio 86, and video 85, signals. Audio 86, and video 85, signals are transferred via real-time protocol/real-time control protocol RTP/RTCP 81 to facilitate synchronization through time-stamping. Data 84 can communicate through General Conference Control GCC 83 or Multipoint Communication Service MCS 82(a), or, it can also communicate directly, before transferring, via Transmission Control Protocol TCP 76. Other applications 88 can also be transferred via TCP 76 or UDP 75 protocol as needed. NC 82(b) always communicates via GCC. Signaling 87 can have primarily three components: RAS control 80, H.245 control 79, and call control 78. H.225.0 entity 94 consists of RTP/RTCP 81, RAS control 80, H.245 control 79, and Call Control 78.

As noted earlier, upper layer application 92 consisting of audio 91, video 90, data 89, signaling 87 and/or other applications 88, can be sent using H.225.0. The reference master clock for synchronization (intermedia/intramedia) is sent to locations L1, L2 and L3 from bridge 7. The LAN-based audio and video signal maintains intra-media and inter-media synchronization using the clock signal sent from the bridge 7.

The signals encapsulated into UDP or TCP are transferred using the IP 73 protocol. The IP packet is then transferred over the LAN (e.g., 2-1 through 2-3, 4-1) using LAN protocol LLC in entity 72 and LAN protocol MAC in entity 71. If the packets come from the LAN to the computer (e.g., switched LAN hub 2-1 to computer 1-1), a similar de-encapsulation of packets takes place from MAC in entity 71 to LLC in entity 72, from LLC in 72 to IP in entity 73, from IP in entity 73 to UDP in entity 77 (or 75) or TCP in entity 76 (or 74). Similarly, the de-encapsulated packet streams are sent from the UDP or the TCP entity to the H.225.0 entity and then from the H.225.0 entity to upper layer entity 92, via intermediate entities (e.g., 86, 85, 84) as needed.

Figure 4B:
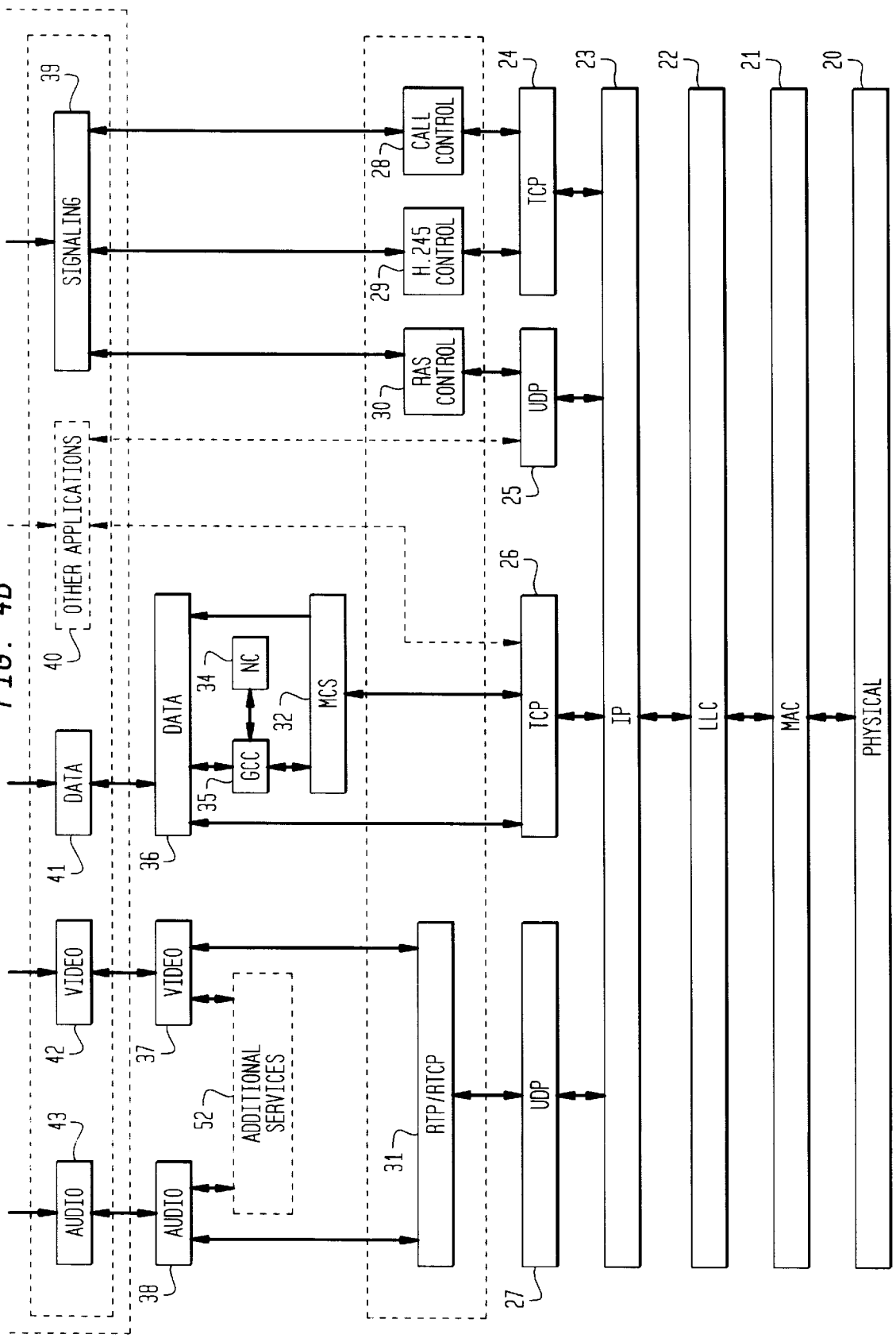
FIG. 4 is one form of NGQOS LAN based multipoint multimedia bridge (MMB) protocol architecture.

The architectural functional entities for bridge 7 are depicted in FIG. 4. This architecture is similar to what has been shown in FIG. 3, but bridge 7 has additional new functionalities required for bridging of audio, video, and data as shown in entity 51.

In particular, bridge 7 has unique functional entities such as multimedia bridge resource manager (BRM) 47, quality of service manager (QOSM) 45, bridge service manager (BSM) 44, and network resource information (NRI) 46. These entities represent some of the enhancements incorporated herein over conventional multimedia bridges. BRM 47 controls resources such as central processing unit (CPU) 47-1, digital signal processor (DSP) 47-2, and memory 47-3 of the bridge. NRI 46 collects all resource information of the network devices via the interim local management interface (ILMI) as specified in the ATM Forum standard for the ATM network. The LANS, in conjunction with the ATM routers, can also use the ILMI scheme to transfer the network resource related information to the NRI. The media bridging functions for audio 50, video 49, and data 48 are performed under the control of BRM 47.

The multimedia performance and resource analysis algorithm (FIGS. 6 through 14) is performed primarily in QOSM 45 of bridge 7 with help of the other new functional entities of bridge 7, including BSM 44, BRM 47, and NRI 46. These functional entities of the bridge 7 execute the stated algorithm, assess what type and quantity of resources that are needed in WAN 8, bridge 7, and at LANs 2-1 through 2-3 and 4-1, and reserve the necessary resources to maintain the desired levels of quality of service for the multimedia conference call. In the course of making the assessment, the absence of any properties to meet the requirements of the multimedia conference call is detected, and the necessary call control signaling messages are sent to the communicating entities at each of the locations, indicating that the multimedia conference call meets all requirements, meets some of the essential requirements (as defined by a particular user, including for example, lip-synchronization, audio delay, video artifacts, delay jitter, bit error rate, cell/packet mis-insertion rate, etc.) but not other less essential requirements (the call can, therefore, be accepted as degraded mode), or does not meet the essential requirements (i.e., the call must be rejected).

As noted earlier, bridge 7 includes multipoint control unit (MCU), gatekeeper (GK), multipoint controller (MC), and multipoint processor (MP) functionalities as specified in the ITU Rec. H.323 standard. The packets coming to bridge 7 from LAN 2-3 are de-encapsulated from MAC in entity 21 to LLC in entity 22 to IP in entity 23 to UDP in entity 25 (or 27) or TCP in entity 24 (or 26) as explained earlier (see FIG. 4). The packet streams can be separated in accordance to audio, video, and data signals as they are sent to higher layers in a similar fashion that has been described in the case of premises-based computers (e.g., computer 1-1). Additional services, such as inter-media and intra-media synchronization for audio and video signals, can be provided in entity 52. Other standard services, such as global serialization of the data Roy 2 streams received from different computer sources located in the premises, can also be provided in entities MCS 32, GCC 35 and NC 34 (as specified in the ITU Rec. T-series standards). The audio, video, and data signals are then transferred for bridging to the upper layer, and bridging functions are performed under the control of BRM 47. The bridged audio, video, and data signals are then sent back to the lower layer functional entities as described earlier for transferring to the destination computers located in the premises.

Every conferee (a "conferee" may be a person who is operating a computer or it may be an autonomous computer) sets up the communication for multipoint multimedia conferencing via bridge 7. A point-to-point communication flow is set up between bridge 7 and each end station or end system participating in the conference (e.g., computers 1-1 and 1-2). The bridging will be performed in accordance to the criteria setup at the time of the conference call (audio, video and data bridging are performed in entities 50, 49 and 48, respectively). For example, bridge 7 can provide either video switching or video mixing. Video switching is the process of selecting the video that bridge 7 outputs to computers 1-1 through 1-5 from one source to another. The criteria used to make the switch may be determined through detection of change in speaker (sensed by the associated audio level) or through control according to the ITU Rec. H.245 signaling control standard. Video mixing is the process of formatting more than one video source into a video stream that bridge 7 outputs to computers 1-1 through 1-5.

Figure 5:
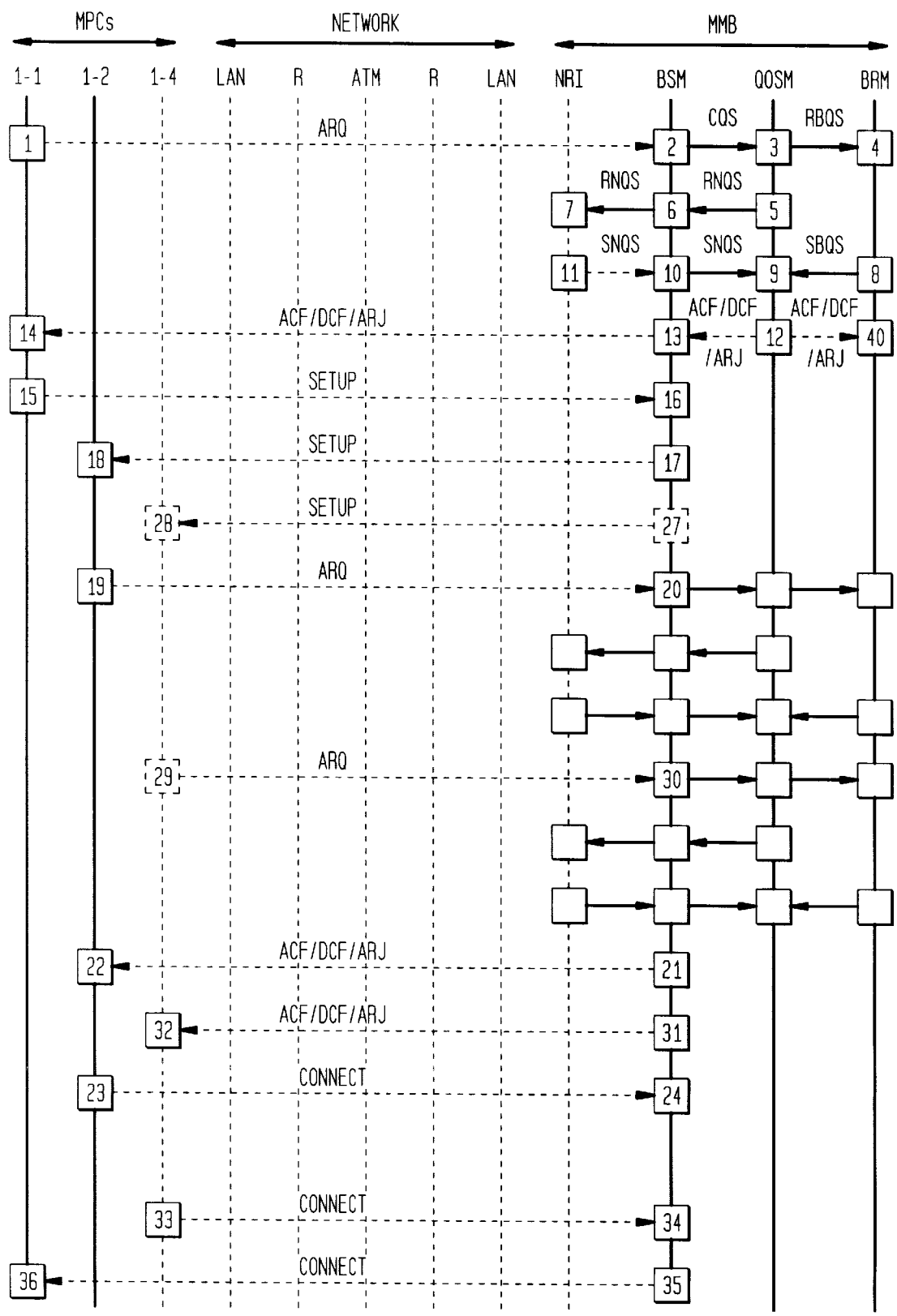
FIG. 5 is one form of a high-level call setup scenario that illustrates how the performance and resource analysis is performed by the different architectural entities of the multipoint multimedia bridge (MMB) during the initial conference call request.
Figure 6:
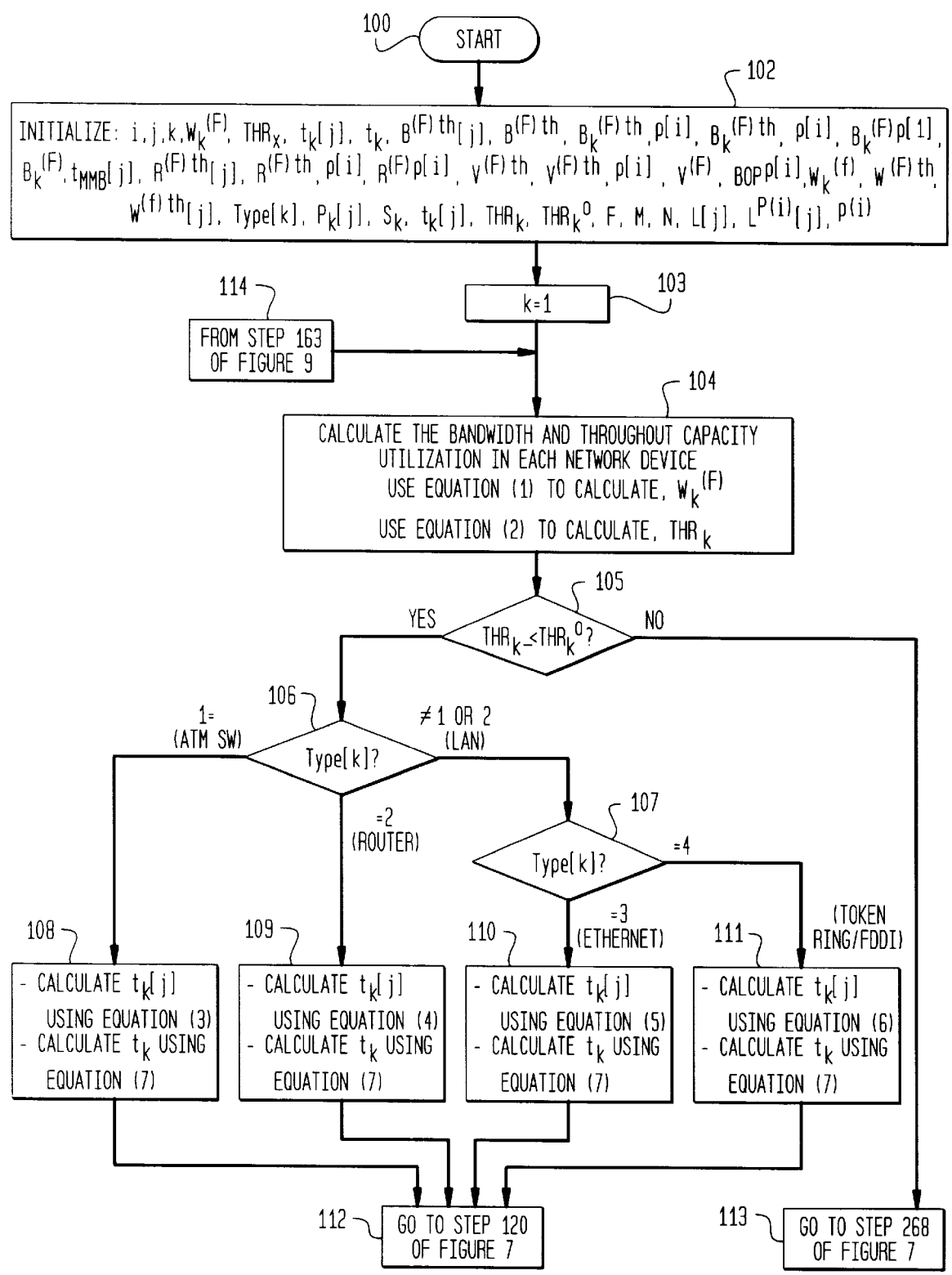
FIGS. 6 through 14 are flow diagrams of one form of a performance and resource analysis algorithm.

FIG. 5 shows one form of a high level call setup scenario between communicating entities via the multimedia bridge. For simplicity, FIG. 5 illustrates only three computers/workstations, 1-1 of location L1, 1-2 of location L2, and 1-4 of location L3, and the network (local area network [LAN], router [R], ATM network [ATM]), and multipoint multimedia bridge [MMB]). The MMB according to the invention includes the additional functional entities discussed above of network resource information (NRI), bridge resource manager (BRM), quality of service manager (QOSM), and multimedia bridge service manager (BSM). The typical call signaling flow through the network entities such as LANs, routers, and the ATM wide area network is not included in FIG. 5, as communication is considered to be already taking place through the pre-established virtual circuits/virtual paths of the ATM network.

Still referring to FIG. 5, in step 1, calling computer 1-1 sends an admission request (ARQ) message to the multipoint multimedia bridge (MMB), using a well known transport layer service access point (TSAP) address of registration, admissions, status (RAS) channel of the bridge requesting a conference call between computers/workstations of other locations. The calling computer also sends information of the bandwidth requirement and quality of service requirements for the conference call to the bridge. Once the ARQ message is received by the lower layer protocol entity of the bridge, the signaling message is sent to the upper layer BSM entity of the bridge.

In step 2, the BSM checks TASP addresses (RAS,H.245, call signaling audio/RTP, audio/RTCP, video/RTP, video/RTCP, and data channels) of the calling computer 1-1, ATM addresses of the called computers (e.g., 1-2 and 1-4), and quality of service requirements for the conference call (i.e., priority levels of all media (audio, video, data), type of services to be provided for all resources that belong to different service levels (for example, "guaranteed service" for priority level 1 resources, and "best effort service" for priority level 2 resources), end-to-end delay requirements for all media (audio, video, data), cell/packet loss tolerances for audio and video signals (data signal with no loss tolerances), bandwidth requirements for each medium (audio, video, data), preferences for communication among the communicating computers-/workstations (usually, the users sitting behind the computers), using different media combinations (audio+video+data, audio+video, audio+data, or audio only) if the preferences are previously known by the calling computer (otherwise, the preferences for communication between the computers can be negotiated by the multimedia bridge), and the criteria for acceptance of the conference call (fully met requirements, partially met requirements that can be termed to operate in degraded mode, or requirements are not met that will force rejection of the call)). At this point, the BSM sends the quality of service related information to the QOSM using the CQS (conference quality of service) message.

At step 3, the QOSM separates the requirements into two parts—network requirements and bridge requirements, and sends a request to the BRM for quality of service parameters of the multimedia bridge using the RBQS (request bridge quality of service) message. At the same time, in step 5, the QOSM also sends a request to the BSM for the network related quality of service parameters using the RNQS (request network quality of service) message. In step 6, the BSM forwards the same RNQS message to the NRI entity to have all necessary network related quality of service parameters.

In step 4, the BRM collects all necessary bridge-related performance parameters (e.g., CPU/DSP capacities and memory utilization). In step 7, the network-related performance parameters (e.g., switch/router/LAN throughput capacities and buffer utilization) are collected by the NRI entity. There are several methods as to how the information related to the network resources may be collected by the NRI entity; one alternative is to use the interim local management interface (ILMI) as specified in the ATM Forum standard for the ATM network; all LANs and routers may use a similar interface to communicate with the NRI entity of the multimedia bridge. In step 11, the NRI entity sends all network-related quality of service parameters, as requested, to the BSM using the SNQS (send network quality of service) message, and in step 10, the BSM forwards the same SNQS message to the QOSM. At the same time, in step 8, the BRM sends all bridge-related quality of service parameters, as requested, to the QOSM using the SBQS (send bridge quality of service) message.

Still referring to FIG. 5, in step 9, the QOSM executes the multimedia performance and resource analysis algorithm (described in further detail below, with reference to FIGS. 6 through 14). At this point, the QOSM determines whether there is sufficient network and bridge resources to (1) provide a call that satisfies all requirements of the conference call, (2) provide a call in which some requirements can be partially met while the others are fully met, qualifying the conference call to operate in "degraded mode", or (3) provide an indication that the call has been rejected due to the unavailability of critical resources.

In step 12, the QOSM sends the ACF (admission for conference call confirmed), DCF (admission for conference call degraded mode confirmed), or ARJ (admission for conference call rejected) message to the bridge service manager and the multimedia bridge resource manager depending on the decision made in step 9. In step 13, the BSM takes steps to reserve resources that are related to the network (e.g., local area network throughput capacity, buffers, ports, and other resources) if the ACF or DCF message is sent (the ILMI scheme, defined in the ATM Forum standard, may be used to reserve the resources of ATM switches and routers). Also, in step 13 the same message ACF, DCF, or ARJ that has been received from the QOSM is sent to the calling computer 1-1 via the network (LAN-R-ATM-R-LAN) by the BSM. Similarly, in step 40, the BRM also reserves the CPU/DSP and memory capacity if ACF or DCF message is received from the QOSM, while no resource will be reserved if ARJ message is received.

Still referring to FIG. 5, in step 14, computer 1-1 analyzes the message received from the BSM. If the ACF or DCF message is received, computer 1-1 sends the setup message to the multipoint multimedia bridge as shown in step 15. In step 16, the BSM analyzes details of the setup message. In step 17, the BSM retransmits the received setup message to the computer 1-2. It may be noted that the bridge can also send setup message to all other called computers simultaneously (e.g., to computer 1-4 from step 27) if they are previously known by the bridge during communication with computer 1-1 or through other mechanisms (e.g., through a "reservation scheme"). At this point, the multimedia bridge can also send the call proceeding message to computer 1-1, but this has not been shown for simplicity. In step 18, computer 1-2 examines whether it will join the conference call requested by the computer 1-1. Computer 1-2 can also send the call proceeding message to the bridge, and the bridge can send the same message back to computer 1-1, but this has not been shown here for simplicity.

Again referring to FIG. 5, in step 19, computer 1-2 sends the ARQ message to the bridge specifying its quality of service parameters for joining the conference call in response to the setup message received from the bridge. In step 20, the BSM examines the ARQ message of the computer 1-2. If the quality of service parameters remain within the parameters analyzed in step 9, no further analysis is done. If however, the quality of service parameters are outside those analyzed in step 9, the sequence of messages (as shown in steps 3 through 12, and step 40) are again performed.

In step 21, the BSM sends an ACF, DCF, or ARJ message to computer 1-2. In step 22, the called computer 1-2 examines the ACF, DCF, or ARJ message sent by the bridge. At this point, computer 1-2 can also send alerting message to the bridge and the bridge can relay back the same alerting message to the calling computer 1-1. This alerting message flow has not been shown for simplicity. In step 23, computer 1-2 sends a connect message to the BSM of the multimedia bridge. Similarly, in step 33, computer 1-4 sends the connect message to the BSM of the multimedia (MMB) bridge. The bridge sends the connect message back to the calling computer 1-1 as shown in steps 35 and 36. In step 35, computer 1-1 analyzes the connect message and prepares for communication with computer 1-2. At this point, computer 1-1 can also send connect acknowledgment message to the bridge and the bridge can send the same message back to the called computer 1-2, but these communication flows are not shown here for simplicity.

FIGS. 6 through 14 describe one form of a unique algorithm for multimedia performance and resource analysis to ensure that there are sufficient resources are available within the multimedia bridge and the network in order to maintain the desired level of performance before acceptance of the conference call. The algorithm estimates the resources needed to satisfy the requirements of the incoming conference call for both the network and the bridge, pre-empts resources devoted to lower priority services to satisfy the needs of the higher priority services if needed, estimates performance budgets for each medium between the network and the bridge to satisfy the performance needs accordingly so that end-to-end performance constraints for each medium are met, calculates delay, throughput capacity and buffering requirements in each network component, and estimates CPU/DSP and memory utilization within the multimedia bridge.

The algorithm is primarily executed within QOSM 45 of bridge 7 with the help of other functional entities such as BSM 44, BRM 47, and NRI 46 (as shown in FIG. 4). The process begins at step 100 of FIG. 6, while initialization is performed in step 102. The variables shown in step 102 represent the following:

i, j, k=dummy variables representing an integer number th=notation representing a single number (e.g., $(F)^{th}$ for F-th flow or $^{(f)th}$ for f-th flow)

$W_k^{(f)}$=Total bandwidth (or bit-rate) requirement in device k by f flows of all media of all priority levels $W^{(f)th}[j]$=Total bandwidth (or bit-rate) requirement in device k by the f-th flow for medium, j Type[k]=Interface for device k (Type[k]=1 for ATM switch, Type[k]=2 for router, Type[k]=3 for Ethernet LAN, and Type[k]=4 for Token Ring LAN)

$P_k[j]$=Packet/cell size of medium, j processed in device k $S_k$=Service rate for device k $t_k[j]$=Queueing, transmission and processing delay for a packet/cell of medium j within device k $THR_k$=Throughput capacity utilization by all flows in device k ($0 \leq THR_k \leq 1$)

$THR^O_k$=Throughput capacity utilization threshold in device k ($0 \leq THR_k \leq 1$)

$t_k$=Average queueing, transmission and processing delay for a packet/cell of any medium in device k $PR_k$=Processing delay of a packet/cell in device k F=Total number of flows M=Total number of medium (e.g., M=3 means that there are three media such as audio, video, and data)

N=Total number of devices between the source-destination MPC excluding the MMB p[i]=Priority level i L[j]=Total cell/packet loss probability for a conference call between the source-destination MPCs including the MMB for medium j of the present flow $L^{p[i]}[j]$=Total cell/packet loss probability for a conference call for medium j belonging to priority level p[i] of the present flow $B_k^{(f)}$=Total number of buffers required in device k by f flows for all media $B_k^{(f)}[j]$=Total number of buffers required in device k by f flows of medium j $B_k^{(f)p[i]}$=Total number of buffers required in device k by f flows of all media of priority level p[i]

$B_k^{(f)th}$=Number of buffers required by the f-th flow by all media of all priority levels in device k $B_k^{(f)th}[j]$=Number of buffers required by the f-th flow by all priority levels of medium j in device k $B_k^{(f)th, p[i]}$=Number of buffers required by the f-th flow of all media of priority level p[i] in device k $B_k^{(f)th, p[i]}[j]$=Number of buffers required by the f-th flow by medium, j of priority level p[i] in device k $B^{(f)p[i]}[j]$=Total number of buffers required by f flows by medium j of priority level p[i]

$R^{(f)}$=Total CPU/DSP utilization within the MMB by f flows by all media of all priority levels $R^{(f)}[j]$=Total CPU/DSP utilization within the MMB by f flows by medium j of all priority levels $R^{(f)p[i]}$=Total CPU/DSP utilization within the MMB by f flows for all media of priority level p[i]

$R^{(f)p[i]}[j]$=Total CPU/DSP utilization within the MMB by f flows by medium j of priority level p[i]

$R^{(f)th}$=CPU/DSP utilization within the MMB by the f-th flow by all media of all priority levels $R^{(f)th}[j]$=CPU/DSP utilization within the MMB by the f-th flow by medium j of all priority levels $R^{(f)th, p[i]}$=CPU/DSP utilization within the MMB by the f-th flow by all media of priority level p[i]

$R^{(f)th, p[i]}[j]$=CPU/DSP utilization within the MMB by the f-th flow by medium j of priority level p[i]

$R^o$=CPU/DSP utilization threshold within the MMB ($0 \leq R^o \leq 1$)

$V^{(f)}$=Total memory requirement within the MMB by f flows for all media of all priority levels $V^{(f)p[i]}$=Total memory requirement within the MMB by f flows for all media of priority level p[i]

$V^{(f)p[i]}[j]$=Total memory requirement within the MMB by f flows for medium j of priority level p[i]

$V^{(f)th}$=Memory requirement within the MMB by the f-th flow of all media of all priority levels $V^{(f)th, p[i]}$=Memory requirement within the MMB by the f-th flow by all media of priority level p[i]

$V^{(f)}[j]$=Memory requirement by f flows of medium j $V^{(f)th}[j]$=Memory requirement by the f-th flow of medium j $V^{(f)th, p[i]}[j]$=Memory requirement within the MMB by the f-th flow by medium of priority level p[i]

$V^o$=Memory requirement threshold level within the MMB $P^{(f)}$=Total CPU/DSP time required within the MMB to process all media of f flows of all priority levels $P^{(f)p[i]}$=Total CPU/DSP time required within the MMB to process all media of f flows of priority level p[i]

$P^{(f)p[i]}[j]$=CPU/DSP time required within the MMB to process medium j of the f-th flow of priority level p[i]

$P^{(f)}[j]$=Total CPU/DSP time required within the MMB to process f flows of medium j of all priority levels $P^{(f)th}[j]$=CPU/DSP time required within the MMB to process the f-th flow of medium j $P^{(f)th}$=CPU/DSP time required within the MMB to process all media of the f-th flow of all priority levels $P^{(f),p[i]}$=CPU/DSP time required within the MMB to process all media of the f-th flow of priority level p[i]

$P^{(f),p[i]}[j]$=CPU/DSP time required within the MMB to process all f flows of priority level p[i] for medium j $t_{MMB}[j]$=Delay budget in the MMB for the present flow of medium $t^o_{MMB}[j]$=Threshold value for delay in the MMB for medium j D[j]=End-to-end delay jitter tolerance for the present flow for medium j BOP=Buffer Overflow Probability (or cell/packet loss probability) for all media of all priority levels $BOP^{p[i]}$=Buffer Overflow Probability (or cell/packet loss probability) for all media belonging to priority level p[i]

The equations required to calculate different performance parameters for multimedia signals can be described as stated below:

$$W_k^{(F)} = \sum_{i=1}^{F} \sum_{j=1}^{M} W_k^{(i)th}[j] \quad (1)$$

$$THR_k = W_k^{(F)}/S_k \quad (2)$$

$$t_k[j] = \frac{(P_k[j])(2 - THR_k)}{S_k(1 - THR_k)} + PR_k \quad (3)$$

$$t_k[j] = \frac{(P_k[j])}{S_k(1 - THR_k)} + PR_k \quad (4)$$

$t_k[j]$=Delay of the packet Ethernet LAN to be calculated in accordance with a published formula (5)

$t_k[j]$=Delay of the packet in Token Ring/FDDI LAN to be calculated in accordance with a published formula (6)

$$t_k^{(F)} = \left(\sum_{j=1}^{M} t_k[j]\right)/M \quad (7)$$

$$B^{(F)th}[j] = (P_k[j])(t_k)(W^{(F)th}[j])\left(1 - \frac{L[j]}{N}\right) \quad (8)$$

$$B^{(F)th} = \sum_{j=1}^{M} B^{(F)th}[j] \quad (9)$$

$$B_k^{(F)th, p[1]} = B_k^{(F)th}[1] + B_k^{(F)th}[2] \quad (10)$$

$$B_k^{(F)th, p[2]} = B_k^{(F)th}[3] \quad (11)$$

$$B_k^{(F)th, p[1]} = B_k^{(F)th}[1] \quad (12)$$

$$B_k^{(F)th, p[2]} = B_k^{(F)th}[2] + B_x^{(F)th}[3] \quad (13)$$

$$B_k^{(F)th,p[1]} = \sum_{j=1}^{M} B_k^{(F)th}[j] \quad (14)$$

$$B_k^{(F)th, p[2]} = 0 \quad (15)$$

$$B_k^{(F)p[1]} = B_k^{(F-1)p[1]} + B_k^{(F)th, p[1]} \quad (16)$$

$$B_k^{(F)p[2]} = B_k^{(F-1)p[2]} + B_k^{(F)th, p[2]} \quad (17)$$

$$B_k^{(F)} = B_k^{(F)p[1]} + B_k^{(F)p[2]} \quad (18)$$

$$B_k^{(F)} = B_k^{(F-1)} + B_k^{(F)th} \quad (19)$$

$$t_{MMB}[j] = E[j] - \left(\sum_{k=1}^{N} t_k[j] + T_{prop}\right) \quad (20)$$

$$R^{(F)th}[j] = \frac{P^{(F)th}[j] + D[j]}{t_{MMB}^{(F)th}[j]} \quad (21)$$

$$R^{(F)th} = \sum_{j=1}^{M} R^{(F)th}[j] \quad (22)$$

$$R^{(F)th, p[1]} = R^{(F)th}[1] + R^{(F)th}[2] \quad (23)$$

$$R^{(F)th, p[2]} = R^{(F)th}[3] \quad (24)$$

$$R^{(F)th, p[1]} = R^{(F)th}[1] \quad (25)$$

$$R^{(F)th, p[2]} = R^{(F)th}[2] + R^{(F)th}[3] \quad (26)$$

$$R^{(F)th,p[1]} = \sum_{j=1}^{M} R^{(F)th}[j] \quad (27)$$

$$R^{(F)th, p[2]} = 0 \quad (27a)$$

$$R^{(F)p[1]} = R^{(F-1)p[1]} + R^{(F)th,p[1]} \quad (28)$$

$$R^{(F)p[2]} = R^{(F-1)p[2]} + R^{(F)th,p[2]} \quad (29)$$

$$V^{(F)th}[j] = (W^{(F)th}[j])(E[j] + D[j] - t_{MMB}[j] + T_{prop}/2) \quad (30)$$

$$V^{(F)th} = \sum_{j=1}^{M} V^{(F)th}[j] \quad (31)$$

$$V^{(F)th, p[1]} = V^{(F)th}[1] + V^{(F)th}[2] \quad (32)$$

$$V^{(F)th, p[2]} = V^{(F)th}[3] \quad (33)$$

$$V^{(F)th, p[1]} = V^{(F)th}[1] \quad (34)$$

$$V^{(F)th, p[2]} = V^{(F)th}[2] + V^{(F)th}[3] \quad (35)$$

$$V^{(F)th,p[1]} = \sum_{j=1}^{M} V^{(F)th}[j] \quad (36)$$

$$V^{(F)th, p[2]} = 0 \quad (37)$$

$$V^{(F)p[1]} = V^{(F-1)p[1]} + V^{(F)th, p[1]} \quad (38)$$

$$V^{(F)p[2]} = V^{(F-1)p[2]} + V^{(F)th, p[2]} \quad (39)$$

$$V^{(F)} = V^{(F)p[1]} + V^{(F)p[2]} \quad (40)$$

$$V^{(F)} = V^{(F-1)} + V^{(F)th} \quad (41)$$

$$BOP^{p[1]} = 1 - \left(1 - BOP_{MMB}^{p[1]}\right)\left(\prod_{i=1}^{N}(1 - BOP[i]^{p[1]})\right) \quad (42)$$

$$BOP^{p[2]} = 1 - \left(1 - BOP_{MMB}^{p[2]}\right)\left(\prod_{i=1}^{N}(1 - BOP[i]^{p[2]})\right) \quad (43)$$

BOP=To be calculated in accordance with a published formula (44)

$$R^{(F)} 32 R^{(F-1)} = R^{(F)th} \quad (45)$$

$$R^{(F)} = R^{(F)p[1]} + R^{(F)p[2]} \quad (46)$$

As noted above, the process begins in step 100 of FIG. 6, and initialization is performed in step 102. In step 104, the bandwidth and throughput capacity utilization in each network device is calculated, where equation (1) is used to calculate the bandwidth (or bit-rate) requirement, $W^{(F)}_k$ in device k by F flows, and equation (2) is used to calculate the throughput capacity utilization, $THR_k$ by all flows in device k.

In step 105, it is examined whether the throughput, $THR_k$, of device k, is less that the threshold throughput, $THR^o{}_k$ set for device k. If $THR_k$ exceeds $THR^o{}_k$, the process proceeds to step 268 of FIG. 14 (as indicated in step 113). Otherwise, the process proceeds to step 106 where it determined whether the device type is an ATM switch (if Type[k]=1), router (if Type[k]=2), or LAN (if Type[k] is not equal to 1 or 2). If the device is an ATM switch, the process proceeds to step 108, which calculates the delay component, $t_k[j]$ for medium j (where j=1 for audio, j=2 for video, and j=3 for data) in device k using equation (3) and calculates the delay component, $t_k$ for device k using equation (7), and then proceeds to step 120 of FIG. 7 (as indicated in step 112). In step 109, if the device is a router, the delay component, $t_k[j]$ for medium j is calculated using equation (4), delay component, $t_k$ is calculated using equation (7), and the process proceeds to step 120 of FIG. 7 (as indicated in step 112). Finally, if the device type is LAN, the process goes to step 107 where it is determined whether the device is an Ethernet (if Type[k]=3) or Token Ring/FDDI (if Type[k]=4) device. If it is an Ethernet device, the process goes to step 110, the delay component, $t_k[j]$ for medium j is calculated using equation (5), and $t_k$ is calculated using equation (7). The process then proceeds to step 120 of FIG. 7 (as indicated in step 112). However, if it is determined in step 107 that the device is a Token Ring/FDDI LAN, the process proceeds to step 111, the delay component, $t_k[j]$ for medium j is calculated using equation (6), $t_k$ is calculated using equation (7) and the process continues to step 120 of FIG. 7 (as indicated in step 112). The equations (5) and (6) that calculate the delays within the Ethernet and Token Ring/FDDI local area network, respectively, can be calculated in a conventional way such as the calculation shown in the published paper of the IEEE Transactions on Communications, vol. COM-29, No. 10, October 1981 (pages 1465–1473).

Figure 7:
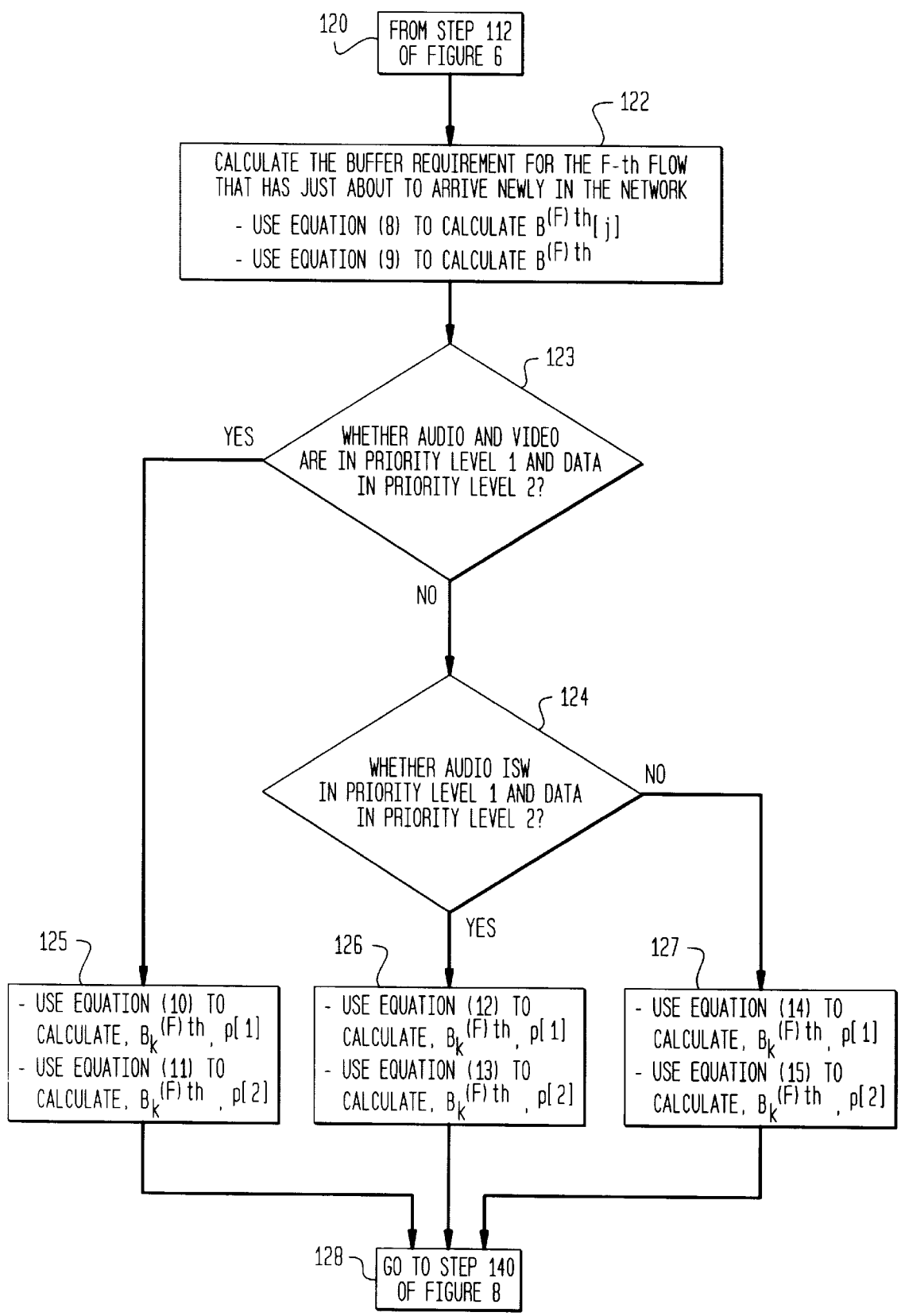
Figure 8:
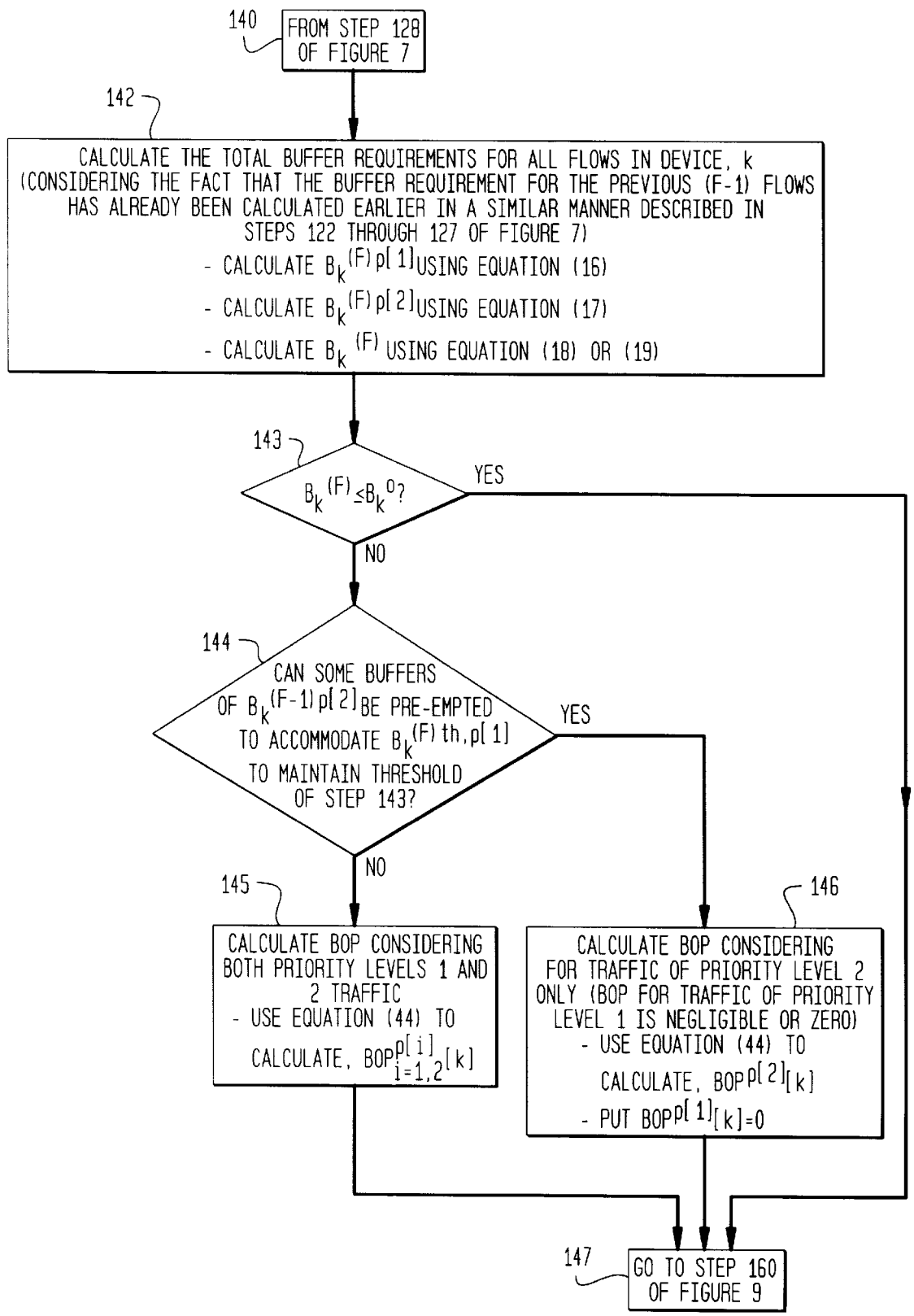

In step 122 of FIG. 7, the process calculates the buffer requirement for the F-th flow in the network device k, since a conference call request has been made by one of the computers located in the premises and the call is "about to arrive" in the network. Equation (8) is used to calculate the buffer requirement, $B^{(F)th}[j]$ for medium j in the device k for the F-th flow that will be generated due to the new conference call, while equation (9) is used to calculate the buffer requirement, $B^{(F)th}$ by all medium of the F-th flow in device k.

Priority level 1 is considered to be the highest priority, while priority level 2 is considered to be the second priority level. The signal (or medium) with priority level 1 is provided "guaranteed service" (i.e., a guarantee that the service "agreed upon" will be provided), while the signal (or medium) with priority level 2 is provided the "best effort service", which will be provided with the resources that are available only after providing the guaranteed service. Moreover, the resources used by priority level 2 service may be pre-empted to meet the requirements of priority level 1 service if needed. Note that for purposes of this description, audio signals have been set as having a priority level of 1, while the priority levels for video and data signals can be negotiated at the time of the conference call setup or can be known prior to the call setup, for example, in the case of a reservation. Obviously, based on fact that audio is set to priority level one there can be several scenarios: case 1—audio and video in priority level 1 and data in priority level 2; case 2—audio and data in priority level 1 and video in priority level 2; and case 3—audio in priority level 1 and data and video and data in priority level 2.

In FIG. 7, step 123, the priority levels of different media are examined. First, it is determined whether the real-time media audio and video signals are in priority level 1 and the data signal is in priority level 2. If so, the process proceeds to step 125; if not, the process proceeds to step 124. In step 125, equation (10) is used to calculate the buffer requirement for the F-th flow, $B_k^{(F)th,p[1]}$ for the priority level 1 resources and equation (11) is used to calculate the buffer requirement for the F-th flow, $B_k^{(F)th,p[2]}$ for the priority level 2 resources. The process then proceeds to step 140 of FIG. 8 (as indicated in step 128).

In step 124, it is determined whether the audio signal is in priority level 1 and the video signal is in priority level 2. If so, the process proceeds to step 126; if not, the process proceeds to step 127. In step 126, equation (12) is used to calculate the buffer requirement for the F-th flow, $B_k^{(F)th,p[1]}$ for the priority level 1 resources and equation (13) is used to calculate the buffer requirement for the F-th flow, $B_k^{(F)th,p[2]}$ for the priority level 2 resources. The process then proceeds to step 140 of FIG. 8 (as indicated in step 128). In step 127, equation (14) is used to calculate the buffer requirement for the F-th flow, $B_k^{(F)th,p[1]}$ for the priority level 1 resources, equation (15) is used to calculate the buffer requirement for the F-th flow, $B_k^{(F)th,p[2]}$ for the priority level 2 resources, and the process proceeds to step 140 of FIG. 8 (as indicated in step 128).

The previous steps show how the buffer requirement for a single flow can be calculated. Similar steps can be taken to calculate the buffer requirement for each flow for a given call and the summation of these results will generate the total requirement for the buffer of all flows of all multimedia calls. Specifically, in step 142 of FIG. 8, the total buffer requirement for all F flows in device k is calculated based on the fact that the buffer requirement for the previous (F−1) flows has already been calculated using similar steps 122 through 127. Equation (16) is used to calculate the total buffer requirement, $B_k^{(F)p[1]}$ for all F flows of all media of priority level 1, equation (17) is used to calculate the total buffer requirement, $B_k^{(F)p[2]}$ for all F flows of all media of priority level 2, and equation (18) or (19) is used to calculate the total buffer requirement, $B_k^{(F)}$ for all F flows of all media of all priority levels. The process then proceeds to step 143.

In step 143, if it is determined that the total buffer requirement, $B_k^{(F)}$ in device k is less than or equal to the pre-set threshold buffer value, $B^o{}_k$ that is being specified for that device, the process goes to step 147; if $B_k^{(F)}$ is not less than or equal to $B^o{}_k$, the process proceeds to step 144, where it is determined whether some buffers, out of the total, $B^{k(F-1)th,p[2]}$ occupied by priority level 2 services in device k, can be preempted for the priority level 1 services of the incoming F-th new flow in order to maintain the threshold value of the buffer of step 143. If some buffers can be preempted (note that "preemption" is based on the previously negotiated terms with the network—i.e., resources of existing calls will be taken away if (1) the buffers occupied by a priority level 2 service are needed for a priority level 1 service and (2) the terms of resources of those calls were not negotiated so as to be maintained in such a situation), the process proceeds to step 146. If the buffers cannot be preempted, the process proceeds to step 145.

In step 146, the total buffer overflow probability (BOP), $BOP^{p[2]}{}_k$ in device k, for priority level 2 services, is calculated using equation (44), while the buffer overflow probability for priority level 1 services, $BOP^{p[1]}{}_k$ is considered to be negligible, and is set to zero, since the required number of buffers for the priority level 1 services has been provided by preempting the priority level 2 services. The process then proceeds to step of 160 of FIG. 9 (as indicated in step 147). It may be noted that the buffer overflow probability using equation (44) can be calculated by a similar approach, shown in the published paper of the IEEE Journal on Selected Areas in Communications, September 1991, vol. 9, No. 7, September 1991 (pages 968–981).

In step 145, the buffer overflow probabilities, $BOP^{p[i]}$ for both priority levels 1 and 2 services (i=1,2) are calculated using equation (44) to determine what the buffer overflow probability would be if the buffer threshold capacity of the device k had been exceeded due to the acceptance of the new flow. The process then proceeds to step of 160 of FIG. 9 (as indicated in step 147).

Figure 9:
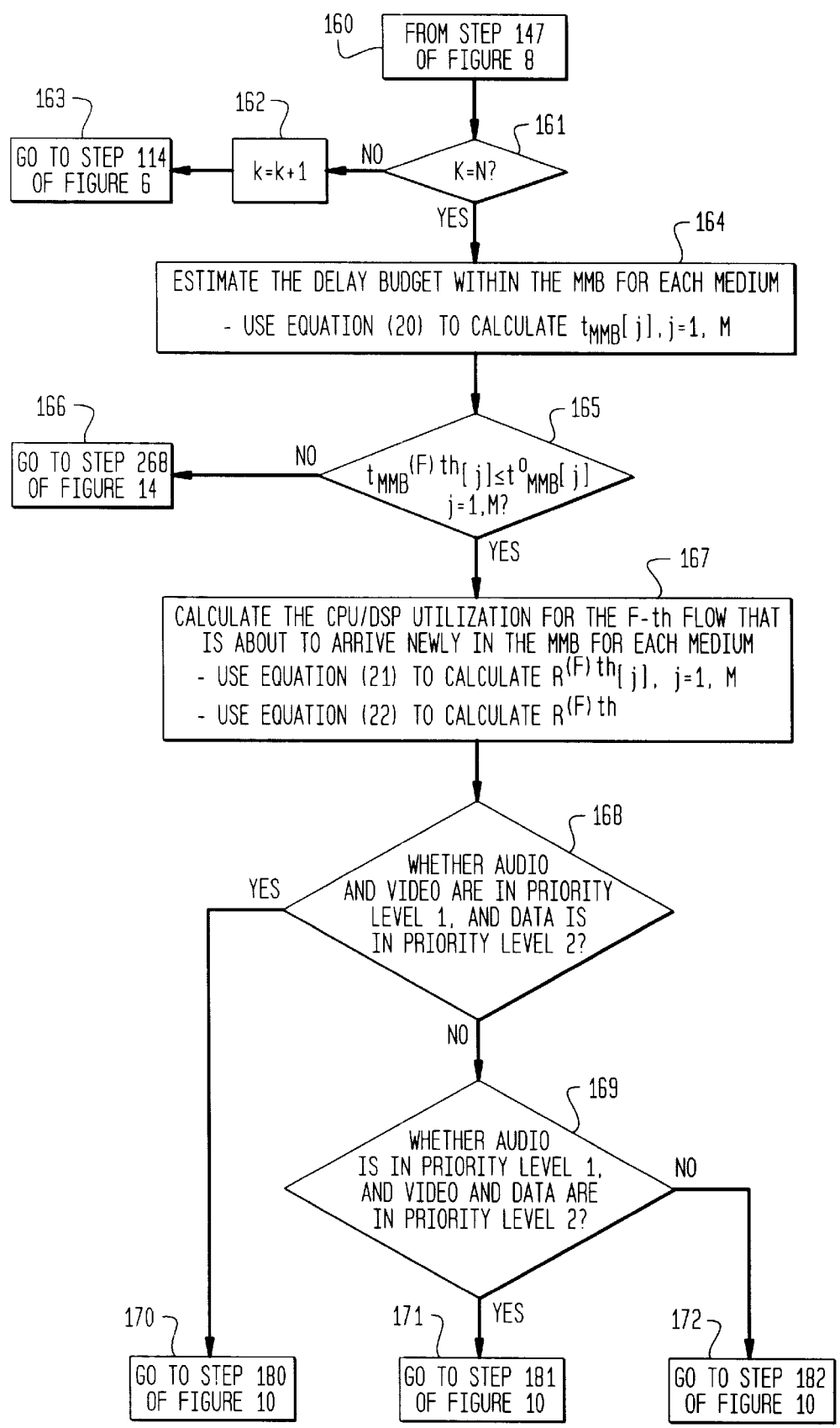

In step 161 of FIG. 9, it is determined whether the calculations, in all N devices that are encountered between the source-destination computers via the ATM wide area network based multipoint multimedia bridge by a given flow, have been completed. If so, the process proceeds to step 164. If not, the process proceeds to step 162, where the device is incremented by one through the step of setting k=k+1. The process then proceeds to step 114 of FIG. 6 (as indicated in step 163).

Figure 15:
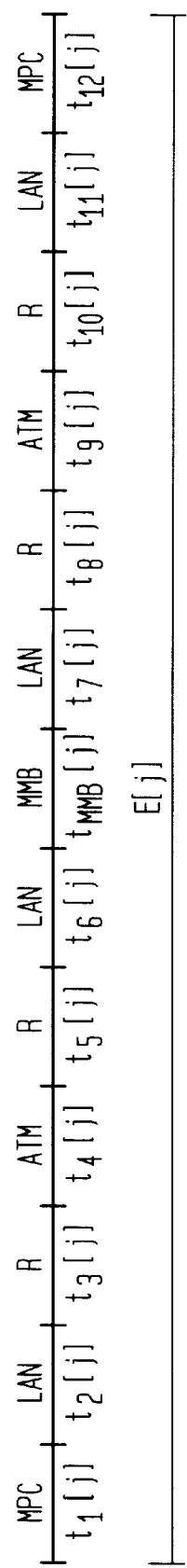
FIG. 15 illustrates one form of the end-to-end delay components between a source and destination for a given flow.

In step 164, the delay budget to perform the bridging function is estimated. FIG. 15 shows the delay components that constitute the end-to-end delay between the source-destination for a given flow. The end-to-end delay requirements for all media are provided at the time of the conference call setup. For example, the performance criteria can be provided during the ARQ message exchanges, at the time of reservation in the case of a prior known reservation system, or by other means. The previous steps (i.e., steps 108–111) show how each delay component, $t_k[j]$ (k=1, N; j=1,M), for each medium, can be calculated. Once these delay components are known, the delay budget within the multimedia bridge, $t_{MMB}[j]$ (j=1,M) for each medium can be calculated using equation (20), after which the process proceeds to step 165.

In step 165, it is determined whether the delay budget of the F-th flow, $t_{MMB}{}^{(F)th}[j]$ (=j1,M), that is supposed to arrive, is less than or equal to the threshold value delay budget, $t_{MMB}{}^\circ[j]$ (j=1,M) within the bridge for each medium. If the delay budget for each medium is not within this constraint, the process proceeds to step 268 (as indicated in step 166) of FIG. 14 (described below). Otherwise, the process proceeds to step 167, where the utilization of the central processing unit(s)/digital signal processor(s) (CPUs/DSPs) of the multipoint multimedia bridge is calculated for the F-th flow of each medium, $R^{(F)th}[j]$ (j=1,M) and the total utilization for the F-th flow by all media, $R^{(F)th}$ that is "about to arrive" using equations (21) and (22), respectively. The process then proceeds to step 168.

Figure 10:
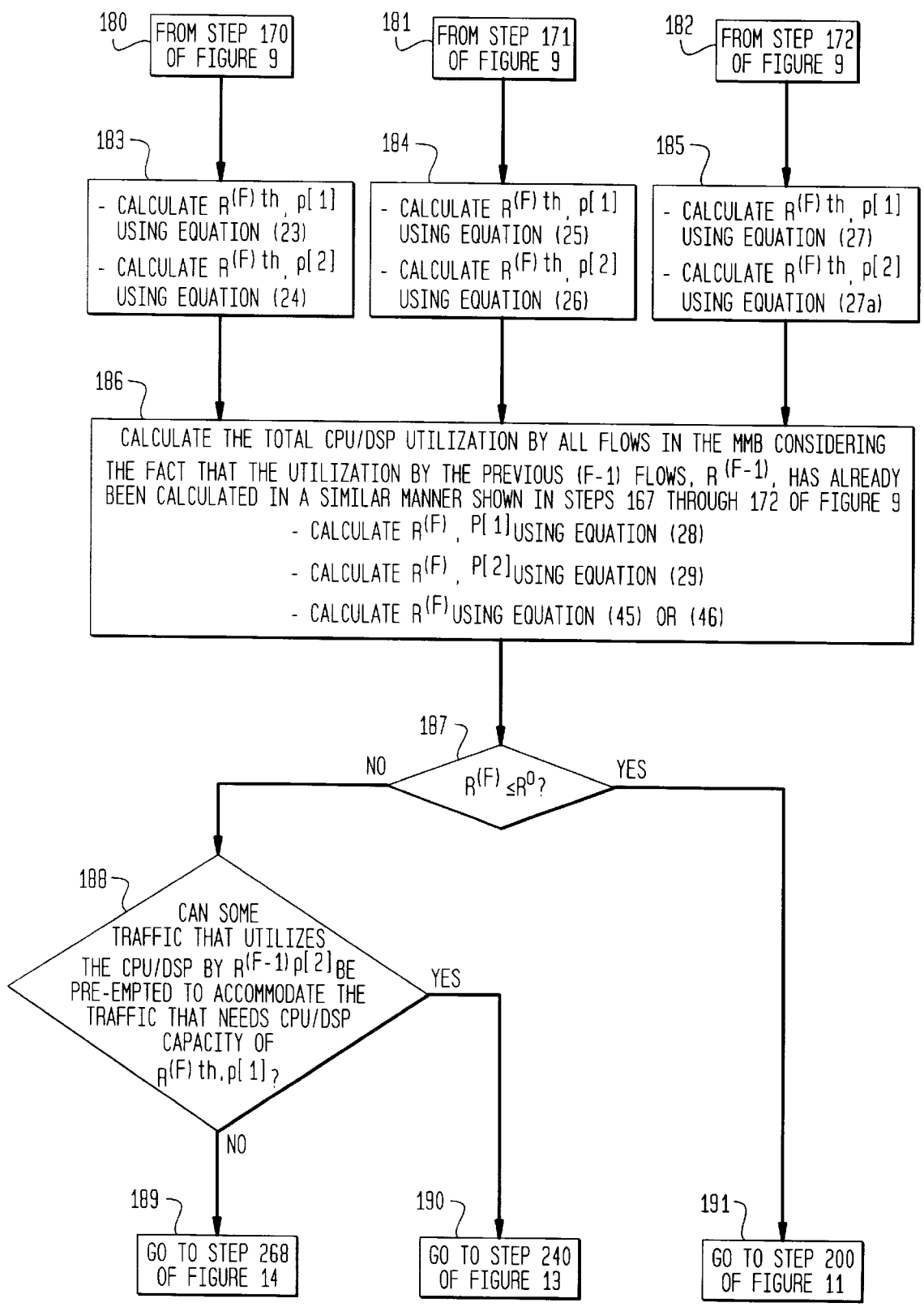

In step 168, if it is determined that the audio and video signals are in priority level 1 and the data signal is in priority level 2, the process proceeds to step 180 of FIG. 10 (as indicated in step 170); if not, the process proceeds to step 169. In step 169, if it is determined that the audio signal is in priority level 1, and the video and data signals are in priority level 2, the process proceeds to step 181 of FIG. 10 (as indicated in step 171); otherwise, the process proceeds to step 182 of FIG. 10 (as indicated in step 172).

In step 183 of FIG. 10, equations (23) and (24) are used to calculate the CPU/DSP utilization, $R^{(F)th,p[1]}$ and $R^{(F)th,p[2]}$ by the F-th flow of priority levels 1 and 2, respectively, and the process then proceeds to step 186. In step 184, equations (25) and (26) are used to calculate the CPU/DSP utilization, $R^{(F)th,p[1]}$ and $R^{[F]th,p[2]}$ by the F-th flow of priority levels 1 and 2, respectively, and the process then proceeds to step 186. In step 185, equations (27) and (27a) are used to calculate the CPU/DSP utilization, $R^{(F)th,p[1]}$ and $R^{(F)th,p[1]}$ by the F-th flow of priority levels 1 and 2, respectively, and the process then proceeds to step 186.

Steps 183–185 show how the CPU/DSP utilization for a single flow can be calculated. Similar steps can be taken to calculate utilization for each flow for a given call and the summation of these results will generate the total multimedia bridge CPU/DSP utilization by all flows of all calls.

In step 186, the total CPU/DSP utilization is calculated by all flows within the ATM network based multipoint multimedia bridge. Equation (28) is used to calculate the total CPU/DSP utilization by all F flows of priority level 1, $R^{(F)p[1]}$, while equation (29) is used to calculate the total CPU/DSP utilization by all F flows of priority level 2, $R^{(F)p[2]}$. Equation (45) or (46) is used to calculate the total CPU/DSP utilization by all flows of all media within the bridge, $R^{(F)}$. The process then proceeds to step 187, where it is determined whether the total CPU/DSP utilization, $R^{(F)}$ is less than or equal to the threshold utilization, $R^\circ$ that has been set within the multimedia bridge. If $R^{(F)}$ is less than or equal to $R^\circ$, the process proceeds to step 200 of FIG. 11 (as indicated in step 191). Otherwise, the process proceeds to step 188, where it is determined whether some of the CPU/DSP capacity utilized by the previous (F−1) flows of priority level 2 services can be preempted to accommodate the priority level 1 services of the F-th flow that is "currently arriving". If some of the capacity can be preempted, the process proceeds to step 240 of FIG. 13 (as indicated in step 190). Otherwise, the process proceeds to step 268 of FIG. 14 (as indicated in step 189).

Figure 11:
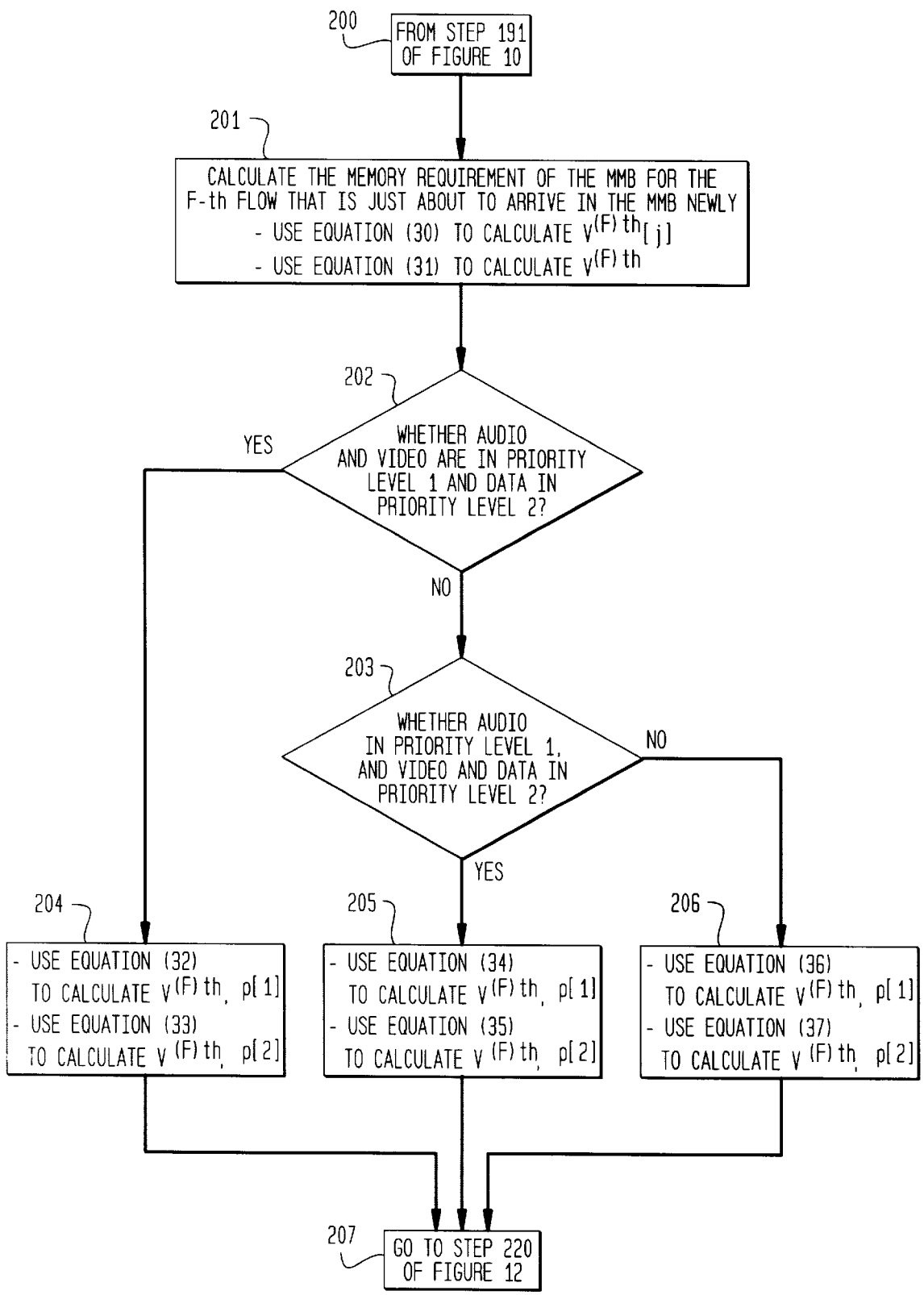

In step 201 of FIG. 11, the memory requirement in the multimedia bridge for the F-th flow that is "currently arriving" is calculated. Equation (30) is used to calculate the memory utilization by the F-th flow of each medium, $V^{(F)th}[j]$ (j=1,M), while equation (31) is used to calculate the total memory requirement by all media of the F-th flow, $V^{(F)th}$. The process then proceeds to step 202, where it is determined whether the audio and video signals are in priority level 1 and the data signal is in priority level 2. If so, the process proceeds to step 204; otherwise, the process proceeds to step 203, where it is determined whether the audio signal is in priority level 1, and the video and data signals are in priority level 2. If so, the process proceeds to step 205; otherwise, the process proceeds to step 206.

In step 204, equation (32) is used to calculate the memory requirement by all media of the F-th flow of priority level 1, $V^{(F)th,p[1]}$, while equation (33) is used to calculate the memory requirement by all media of the F-th flow of priority level 2, $V^{(F)th,p[2]}$. The process then proceeds to step 220 of FIG. 12 (as indicated in step 207).

In step 205, equation (34) is used to calculate the memory requirement by the F-th flow of priority level 1, $V^{(F)th,p[1]}$, while equation (35) is used to calculate the memory requirement by the F-th flow of priority level 2, $V^{(F)th,p[2]}$. The process then proceeds to step 220 of FIG. 12 (as indicated in step 207).

In step 206, equation (36) is used to calculate the memory requirement by all media of the F-th flow of priority level 1, $V^{(F)th,p[1]}$, while equation (37) is used to calculate the memory requirement by the F-th flow of priority level 2, $V^{(F)th,p[2]}$. The process then proceeds to step 220 of FIG. 12 (as indicated in step 207).

The previous steps show how the memory requirement for a single flow can be calculated. Similar steps can be taken to calculate the memory requirement for each flow for a given call and the summation of these results will generate the total multimedia bridge memory requirement by all flows of all calls.

Figure 12:
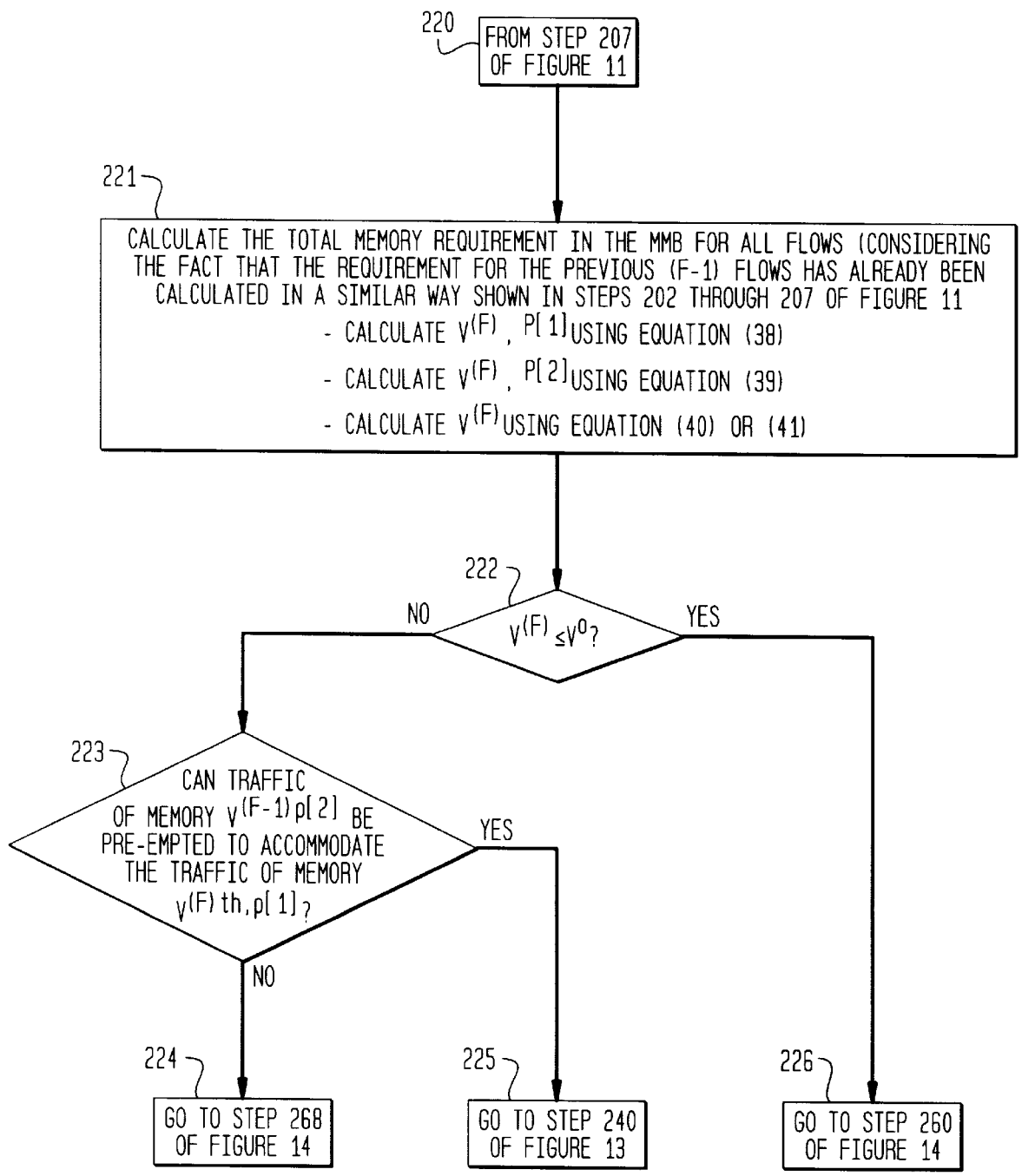

In step 221 of FIG. 12, the total memory requirement for all flows within the bridge is calculated based on the fact that the memory requirement of the bridge for the previous (F−1) flows has also been calculated in a similar manner as has been described above. The total memory requirements for all F flows of all media of priority level 1, $V^{(F)p[1]}$ and that for priority level 2, $V^{(F)p[2]}$ are calculated using equations (38) and (39), respectively. The total memory requirement of the bridge by all F flows of all priority levels by all media, $V^{(F)}$ is calculated by using equation (40) or (41). The process then proceeds to step 222.

In step 222, it is determined whether the total memory requirement, $V^{(F)}$ in the bridge is less than or equal to the memory threshold value, $V^o$ of the bridge. If so, the process proceeds to step 260 of FIG. 14 (as indicated in step 226). Otherwise, the process proceeds to step 223 where it is determined whether some of the memory capacity utilized by the priority level 2 services of the previous (F−1) flows may be preempted for the priority level 1 services of the F-th flow that is "currently arriving". If some of the memory capacity can be preempted, the process proceeds to step 240 of FIG. 13 (as indicated in step 225). Otherwise, the process proceeds to step 268 of FIG. 14 (as indicated in step 224).

It may be noted that the preemption of real-time audio or video signals will cause an additional delay for the preempted signals. This additional delay is very critical for the real-time signal, since the real-time signal has to meet its stringent deadline. The real-time signal will be lost if the deadline is not met and the signal cannot be recovered through retransmission. Although some losses can be tolerated by real-time media, excessive losses can cause the subjective quality of these signals to degrade. However, data signals cannot tolerate losses, but can tolerate a much higher delay than that of real-time audio or video signals. The higher level protocols for data signals can have recovery mechanisms to recover from losses or errors through retransmissions.

Figure 13:
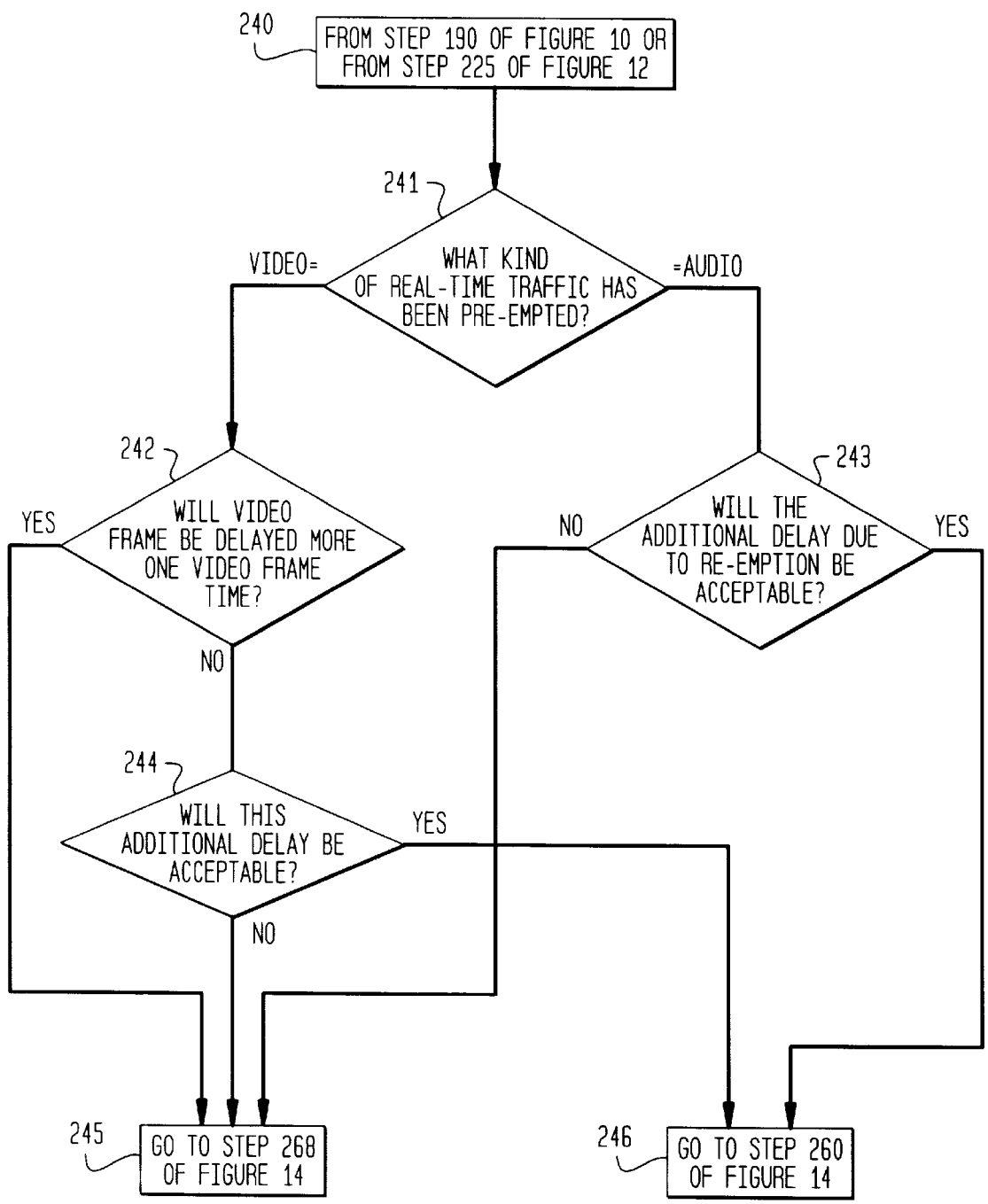

In step 241 of FIG. 13, it is determined what kind of real-time traffic has been preempted, audio or video. If the video signal has been pre-empted, the process proceeds to step 242 and if the audio signal has been pre-empted the process proceeds to step 243.

In step 242, it is determined whether the video signal will be delayed more than one video frame time due to its preemption. If the delay will be more than one video time frame, the process proceeds to step 268 of FIG. 14 (as indicated in step 245). Otherwise, the process continues to step 244.

In step 243, it is determined whether the additional delay due to preemption of the audio signal will be acceptable (based on the message sent to the bridge specifying the quality of service parameters required for joining the conference call). If the delay is acceptable, the process proceeds to step 260 of FIG. 14 (as indicated in step 246). Otherwise, the process proceeds to step 268 of FIG. 14 (as indicated in step 245).

Finally, in step 244 it is determined whether the additional delay, of less than one time frame, that is incurred due to preemption of the video signal, will be acceptable (again, based on the QOS parameters indicated at the time of the call setup). If the delay is acceptable, the process proceeds to step 260 of FIG. 14 (as indicated in step 246). Otherwise, the process proceeds to step 268 of FIG. 14 (as indicated in step 245).

Figure 14:
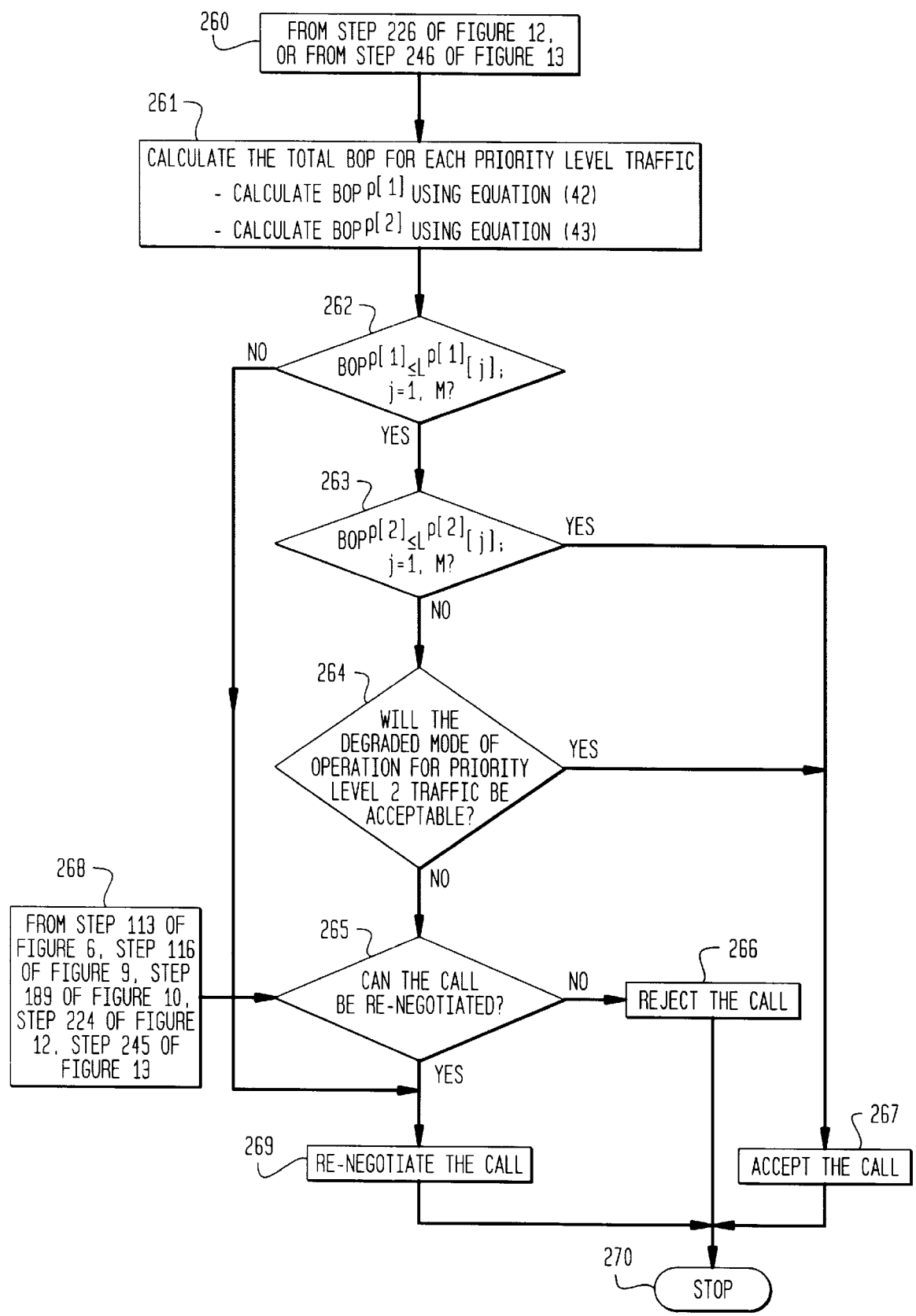

The total buffer overflow probability (BOP) for each priority level is calculated in step 261 of FIG. 14. Equations (42) and (43) are used to calculate the overall buffer overflow probabilities for priority level 1, $BOP^{p[1]}$ and that for priority level 2, $BOP^{p[2]}$, respectively. The process then continues to step 262, where it is determined whether the overall buffer overflow probability for the priority level 1, $BOP^{p[1]}$ resources is less or equal to the cell/packet loss probability, $L^{p[1]}[j]$ (j=1,M) requirement that has been specified for the priority level 1 for each medium. If it is less than or equal, the process proceeds to step 263 Otherwise, the process proceeds to step 269 where it sends a request for re-negotiation of the conference call.

In step 263 it is determined whether the overall buffer overflow probability for the priority level 2, $BOP^{p[2]}$ is less than or equal to the cell/packet loss probability, $L^{p[2]}[j]0$ (j=1,M) requirement that has been specified for the priority level 2 for each medium. If so, the process continues to step 267 where it sends a request for acceptance of the conference call. Otherwise, the process proceeds to step 264, where it is determined whether the degraded mode of operation for the priority level 2 signal(s) will be acceptable. If it is acceptable, the process proceeds to step 267 where it sends a request for acceptance of the conference call. Otherwise, the process proceeds to step 265, where it is determined whether the conference call can be re-negotiated. If it can be re-negotiated, the process continues to step 269 where it sends a request for re-negotiation of the conference call. Otherwise, the process proceeds to step 266 where it sends a request to reject the conference call.

In step 269, a request is sent by the process to re-negotiate the conference call and then the process stops, as shown in step 270. In step 266, a request is sent by the process for rejection of the conference call and then the process stops, again as shown in step 270. Finally, in step 267, a request is sent by the process for acceptance of the conference call and then the process stops, as shown in step 270.

It should be noted, referring again to FIG. 1, that in a "premium service" mode, all conference participating computers (end stations or participants) within a customer premises are considered to be connected to switched nonguaranteed quality of service LANs, where only the switched LAN hubs (e.g, hubs 2-1, 2-2) are shared. The switched LAN hubs are directly connected to ATM routers (e.g., routers 3-1 and 3-3 with ATM interfaces) and the ATM routers are directly connected to the ATM wide area network 8. In this situation, the traffic and performance characteristics within the ATM routers will have been deemed by the algorithm to definitely satisfy the desired requirements specified in the premium service criteria. The ATM wide area network-based multimedia conferencing service provider will guarantee maintenance of the "negotiated" superior quality of service for the multimedia conferencing services, provided that the shared switched hubs and the ATM routers operate within the given performance guidelines.

In a "semi-premium service" mode, there can be a mix of switched and shared nonguaranteed quality of service LANs. In this mode, there can be only a conditional guarantee of quality of service (i.e., the quality of service is only "conditionally guaranteed" to the extent that the "shared"

LANs provide what is needed to complete the connection as "negotiated" by the bridge) by the ATM wide area network-based multimedia conferencing service provider.

Finally, in a "non-premium service" mode, the ATM wide area network-based multimedia conferencing service provider uses its best effort to maintain a quality of service at no less than the performance levels that have been provided to the incoming signals that are coming out of the premises-based ATM routers.

It should be noted that although a preferred embodiment of the invention is discussed in detail above, the "guaranteed" ATM network illustrated in FIG. 1 may in fact be any "guaranteed service" network and would still remain encompassed by the invention. In addition, although FIG. 1 illustrates only "nonguaranteed" switched LAN hubs and a shared LAN, in fact additional, "guaranteed" (for example, ISDN-based) MPC's could also be incorporated into the disclosed application without departing from the spirit and scope of the invention.

What is claimed is:

1. A method for providing real-time multimedia conferencing services to a dispersed plurality of locations, where at least some of the locations employ local area networks, said plurality of locations being interconnected by a guaranteed service wide area network, where multimedia signals originating at the locations need resources within the wide area network and within a multimedia bridge connected to the wide area network, comprising the steps of:

receiving multimedia signals from the local area networks at the wide area network by way of respective network routers;

bridging the multimedia signals in the multimedia bridge; and transmitting the bridged multimedia signals from the wide area network to one or more of the plurality of locations by way of respective network routers, transmissions within said wide area network comprising statistical multiplexing of said multimedia signals, whereby the bandwidth required to transmit the multimedia signals between the plurality of locations is reduced.

2. The method of claim 1, wherein said wide area network comprises an ATM network.

3. The method of claim 2, wherein said statistical multiplexing comprises statistical multiplexing using cell switching for transmission on the ATM network.

4. The method of claim 1, wherein each of the local area networks is a switched local area network, wherein multimedia conferencing services are provided with a guarantee of quality of service parameters.

5. The method of claim 1, wherein the local area networks include at least one shared local area network and at least one switched local area network, wherein improved multimedia conferencing services are provided with a conditional guarantee of quality of service parameters.

6. A method for providing real-time multimedia conferencing services to a dispersed plurality of locations, where at least some of the locations employ local area networks, said plurality of locations being interconnected by a guaranteed service wide area network, where multimedia signals originating at the locations need resources within the wide area network and within a multimedia bridge connected to the wide area network, comprising the steps of:

receiving multimedia signals from the local area networks at the wide area network by way of respective network routers;

bridging the multimedia signals in the multimedia bridge, wherein the multimedia bridge is connected to the wide area network through a local area network and a network router;

transmitting the bridged multimedia signals over the wide area network employing statistical multiplexing of said multimedia signals; and transmitting said multimedia signals from said wide area network to one or more of the plurality of locations by way of respective network routers, whereby the bandwidth required to transmit the multimedia signals between the plurality of locations is reduced.

7. The method of claim 6, wherein the local area network connecting the multimedia bridge to the wide area network connects only the multimedia bridge.

8. The method of claim 6, wherein the local area network connecting the multimedia bridge to the wide area network also connects personal computers to the wide area network.

* * * * *